United States Patent
Kim et al.

(10) Patent No.: US 11,513,478 B2
(45) Date of Patent: Nov. 29, 2022

(54) AI APPARATUS AND OPERATION METHOD THEREOF

(71) Applicant: LG ELECTRONICS INC., Seoul (KR)

(72) Inventors: Hyoeun Kim, Seoul (KR); Jaehong Kim, Seoul (KR); Taeho Lee, Seoul (KR); Hangil Jeong, Seoul (KR); Jongwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 571 days.

(21) Appl. No.: 16/497,760

(22) PCT Filed: Mar. 8, 2019

(86) PCT No.: PCT/KR2019/002717
§ 371 (c)(1),
(2) Date: Sep. 25, 2019

(87) PCT Pub. No.: WO2020/184735
PCT Pub. Date: Sep. 17, 2020

(65) Prior Publication Data
US 2021/0333763 A1 Oct. 28, 2021

(51) Int. Cl.
*G05B 13/02* (2006.01)
*D06F 58/34* (2020.01)
(Continued)

(52) U.S. Cl.
CPC .......... *G05B 13/027* (2013.01); *D06F 33/50* (2020.02); *D06F 34/05* (2020.02); *D06F 34/18* (2020.02); *D06F 58/34* (2020.02); *G06V 20/20* (2022.01)

(58) Field of Classification Search
CPC .......... D06F 58/34; D06F 34/05; D06F 33/50; D06F 34/18; G05B 13/027; G06V 20/20
(Continued)

(56) References Cited

U.S. PATENT DOCUMENTS 7,322,126 B2 * 1/2008 Beaulac .................. D06F 58/38
34/554
7,337,553 B2 * 3/2008 Stein ....................... D06F 58/22
34/529
(Continued)

FOREIGN PATENT DOCUMENTS

CN 101298738 11/2008
CN 202273103 6/2012
(Continued)

OTHER PUBLICATIONS

Indian Intellectual Property Office Application Serial No. 201934050026, Office Action dated Dec. 18, 2020, 8 pages.
(Continued)

*Primary Examiner* — Stephen M Gravini
(74) *Attorney, Agent, or Firm* — Lee, Hong, Degerman, Kang & Waimey PC

(57) ABSTRACT

Disclosed is an artificial intelligence (AI) apparatus comprising: a short-range communication module configured for sensing a plurality of laundry treatment apparatuses positioned around the AI apparatus; and a processor configured for: acquiring laundry information about laundry and characteristic information of each of the detected laundry treatment apparatuses; determining a laundry group corresponding to the laundry, based on the acquired laundry information; comparing characteristic information of the determined laundry group and characteristic information of each of the plurality of laundry treatment apparatuses with each other; and determining a laundry treatment apparatus
(Continued)

for washing the laundry among the plurality of laundry treatment apparatuses based on the comparison result.

13 Claims, 22 Drawing Sheets

(51) Int. Cl.
*D06F 34/05* (2020.01)
*D06F 33/50* (2020.01)
*D06F 34/18* (2020.01)
*G06V 20/20* (2022.01)

(58) Field of Classification Search
USPC .......................................................... 706/11
See application file for complete search history.

(56) References Cited

U.S. PATENT DOCUMENTS

| | | | | |
|---|---|---|---|---|
| 7,469,288 | B2* | 12/2008 | Tuttle | D06F 95/00 709/224 |
| 8,800,164 | B2* | 8/2014 | Kim | D06F 33/50 137/597 |
| 9,739,004 | B2* | 8/2017 | Ha | D06F 33/37 |
| 9,951,465 | B1* | 4/2018 | Herschler | D06F 34/18 |
| 10,240,276 | B2* | 3/2019 | Ryoo | D06F 58/24 |
| 2001/0025392 | A1 | 10/2001 | Youn et al. | |
| 2005/0109070 | A1 | 5/2005 | Kobayashi et al. | |
| 2005/0140506 | A1 | 6/2005 | Oh et al. | |
| 2012/0090099 | A1 | 4/2012 | Kim et al. | |
| 2017/0009390 | A1 | 1/2017 | Suh et al. | |
| 2019/0302091 | A1 | 10/2019 | Kessler et al. | |
| 2020/0116627 | A1 | 4/2020 | Kessler et al. | |
| 2021/0333763 | A1* | 10/2021 | Kim | D06F 58/34 |
| 2022/0042231 | A1* | 2/2022 | Jang | D06F 58/10 |
| 2022/0103525 | A1* | 3/2022 | Shribman | H04L 63/029 |

FOREIGN PATENT DOCUMENTS

| | | |
|---|---|---|
| CN | 104846588 | 8/2015 |
| CN | 107893309 | 4/2018 |
| CN | 108221267 | 6/2018 |
| CN | 108866934 | 11/2018 |
| DE | 102017209857 | 12/2018 |
| EP | 2441871 | 4/2012 |
| KR | 1020010093569 | 10/2001 |
| KR | 1020130070815 | 6/2013 |
| KR | 1020150105844 | 9/2015 |
| KR | 1020160004238 | 1/2016 |
| WO | 2018011173 | 1/2018 |

OTHER PUBLICATIONS

European Patent Office Application Serial No. 20158638.5, Search Report dated Jul. 14, 2020, 10 pages.
PCT International Application No. PCT/KR2019/002717, Written Opinion of the International Searching Authority dated Dec. 6, 2019, 8 pages.
State Intellectual Property Office of the People's Republic of China Application Serial No. 2020100221645.9, Office Action dated Apr. 7, 2022, 12 pages.

* cited by examiner

| | COTTON \| Cotton |
| --- | --- |
| | LIGHT WEIGHT, GOOD DURABILITY AND EASY TO WASH |
| | HAND WASH · WATER WASH · DRY CLEANING · DO NOT TWIST |
| | WOOLEN \| Woolen |
| | GOOD WARMTH AND WEAK DURABILITY |
| | HAND WASH (NEUTRAL DETERGENT) · WATER WASH (NEUTRAL DETERGENT) · DO NOT TWIST · DRY CLEANING · DRY IN THE SHADE |
| | NYLON (POLYAMIDE) \| Nylon(Polyamide) |
| | GOOD RESILIENCE, GOOD WRINKLE AND LIGHT WEIGHT |
| | HAND WASH (NEUTRAL DETERGENT) · WATER WASH (NEUTRAL DETERGENT) · DRY CLEANING · DRY IN THE SHADE |
| | ACRYLIC \| Acrylic |
| | SOFTNESS, LIGHT WEIGHT AND GOOD WARMTH |
| | HAND WASH (NEUTRAL DETERGENT) · WATER WASH (NEUTRAL DETERGENT) · DRY CLEANING · DRY IN THE SHADE |
| | NAPPING \| Napping |
| | SOFTNESS AND WARMTH |
| | HAND WASH (NEUTRAL DETERGENT) · WATER WASH (NEUTRAL DETERGENT) · DO NOT TWIST · DRY CLEANING |
| | DENIM \| Denim |
| | STRONG DURABLE FABRIC MAINLY USED FOR JEANS |
| | HAND WASH (NEUTRAL DETERGENT) · WATER WASH (NEUTRAL DETERGENT) · DRY CLEANING · DRY IN THE SHADE |

| | WASHING TIME | NUMBER OF RINSES | DEHYDRATION INTENSITY | WATER FLOW INTENSITY | DAMAGE |
|---|---|---|---|---|---|
| COTTON | 15 | 3 | HIGH | HIGH | 1 |
| WOOLEN | 11 | 2 | LOW | LOW | 6 |
| NYLON | 14 | 3 | MEDIUM | HIGH | 4 |
| ACRYLIC | 13 | 3 | MEDIUM | HIGH | 3 |
| NAPPING | 9 | 2 | LOW | LOW | 7 |
| DENIM | 10 | 2 | MEDIUM | MEDIUM | 7 |

FIG. 12

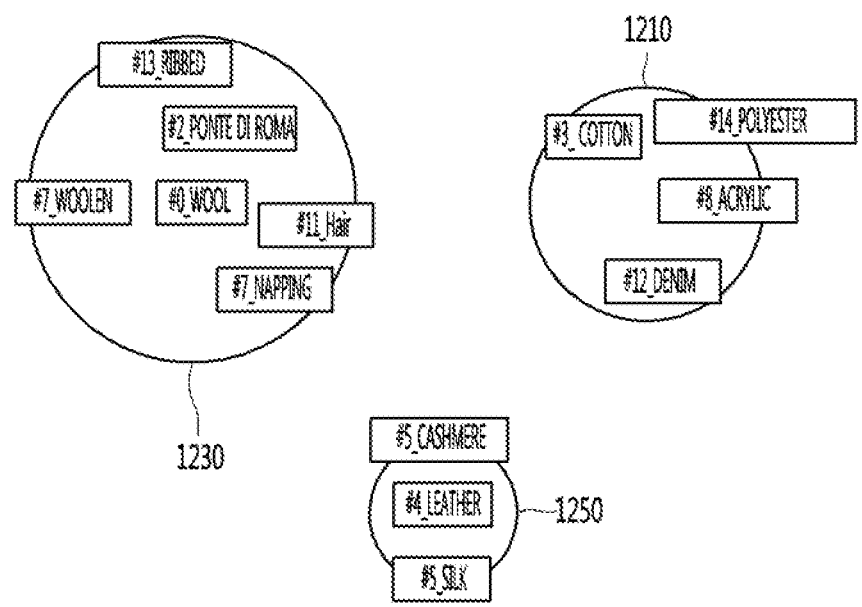

FIG. 13

| GROUP A | |
|---|---|
| MAXIMUM WASHING | 12 |
| MINIMUM WASHING | 9 |
| MAXIMUM RINSE | 2 |
| MINIMUM RINSE | 2 |
| MAXIMUM DEHYDRATION | LOW |
| MINIMUM DEHYDRATION | LOW |
| MAXIMUM WATER TEMPERATURE | HOT/COLD |
| MINIMUM WATER TEMPERATURE | COLD |
| MAXIMUM WATER FLOW INTENSITY | MEDIUM |
| MINIMUM WATER FLOW INTENSITY | LOW |

| GROUP B | |
|---|---|
| MAXIMUM WASHING | 17 |
| MINIMUM WASHING | 15 |
| MAXIMUM RINSE | 3 |
| MINIMUM RINSE | 3 |
| MAXIMUM DEHYDRATION | HIGH |
| MINIMUM DEHYDRATION | HIGH |
| MAXIMUM WATER TEMPERATURE | HOT |
| MINIMUM WATER TEMPERATURE | HOT |
| MAXIMUM WATER FLOW INTENSITY | HIGH |
| MINIMUM WATER FLOW INTENSITY | HIGH |

| type | model name | Capacity(kg) | function_Boiling availability | function_Steam availability | function_Small amount washing availability | Cleaning power(0~5) | Average damage (0~5) | Power consumption (W) |
|---|---|---|---|---|---|---|---|---|
| Tub-rotating | TW22W | 22 | X | X | X | 5 | 5 | 1500 |
| Drum type | F21BV | 12 | △ | O | O | 3 | 3 | 2200 |
| Drum type | FH1SV8NM | 19 | △ | O | O | 3 | 3 | 2200 |
| Mini wash | F4VC | 4 | O | O | O | 4 | 4 | 1500 |
| Mini washing machine | F5VR | 5 | O | X | O | 3 | 2 | 145~1530 |

| Encoded values of the characteristic elements of the laundry group | Encoded values of characteristic elements of an external laundry treatment apparatus | Score |
|---|---|---|
| Boiling availability (2) | Boiling availability (2) | 10 |
| Steam availability (1) | Steam availability (1) | 10 |
| Number of laundry (5) | Small amount washing function (1) | 8 |
| Average damage (5) | Average damage (3) | 6 |
| average washing time (17) /average rinsing frequency (3) | Washing capacity (3) | 7 |
| | Total | 41 |

FIG. 26

| Apparatus | Score |
|---|---|
| First external laundry treatment apparatus | 34 |
| Second external laundry treatment apparatus | 41 |
| Third external laundry treatment apparatus | 29 |

FIG. 28

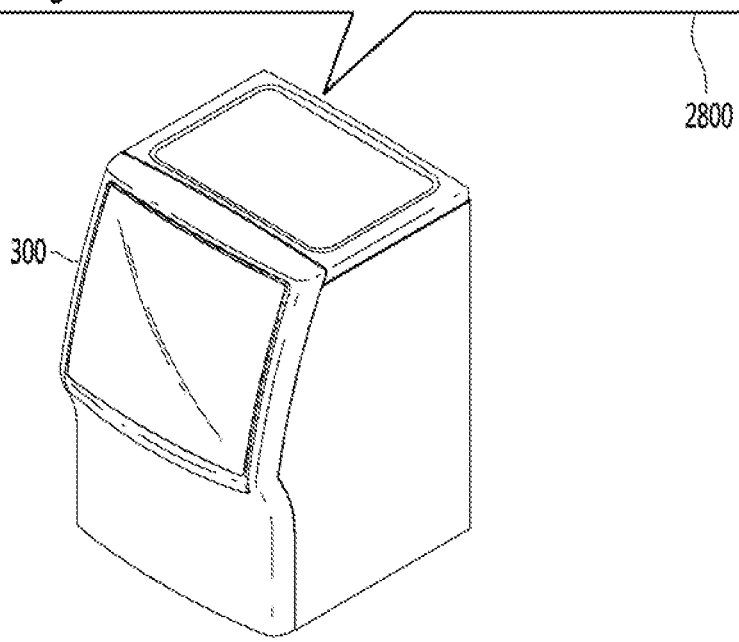

Group A: Seven cotton laundry and four polyester laundry/ instructions: boiling available, steam available, one laundry having high probability of dye transfer Group B: Eight cotton denim / instructions: boiling non-available, steam available, steam available, none having high probability of dye transfer Group C: Three wool laundry and four polyester laundry/ instructions: boiling non-available, steam non-available, three laundry having high probability of dye transfer Input Group A into 22 Kg tub-rotating type machine & whether to add boiling (yes or no)
Input Group B into me & whether to add steaming (yes or no)
Input Group C into 5 Kg Mini Wash

AI APPARATUS AND OPERATION METHOD THEREOF

CROSS-REFERENCE TO RELATED APPLICATIONS

This application is the National Stage filing under 35 U.S.C. 371 of International Application No. PCT/KR2019/002717, filed on Mar. 8, 2019, the contents of which are hereby incorporated by reference herein its entirety.

BACKGROUND OF THE DISCLOSURE

Field of the Disclosure

The present disclosure relates to an artificial intelligence (AI) apparatus, and, more specifically, to an AI apparatus that can select an optimal laundry treatment apparatus according to information about laundry.

Discussion of the Related Art

In modern times, a laundry treatment apparatus or washing auxiliary apparatus is an essential household appliance in every household.

Clothing, bedding or dolls that are to be subjected to washing are made up of various materials. Washing requirements may different between different materials. Therefore, current washing or washing auxiliary apparatuses provide several washing courses to provide proper washing function adapted to various materials.

In a conventional laundry treatment apparatus or washing auxiliary apparatus, when a user selects a predetermined washing course, the predetermined washing course is executed. Alternatively, when the user sets parameters for each washing step per each washing, a washing course reflecting the parameters is executed.

Further, in recent years, a plurality of laundry treatment apparatuses have been provided at home. When a user wants to wash various types of laundry, there is a problem that it is difficult for the user to determine which laundry treatment apparatus to be used.

SUMMARY OF THE DISCLOSURE

A purpose of the present disclosure is to provide an AI apparatus capable of recommending an optimal laundry treatment apparatus for washing laundry composed of a plurality of different textile materials among a plurality of different laundry treatment apparatuses when there are the plurality of different laundry treatment apparatuses.

A purpose of the present disclosure is to provide an optimal washing course that satisfies proper cleaning power while minimizing damage to the entire laundry when input laundry is composed of various textiles with different characteristics.

Further, a purpose of the present disclosure is to provide a customized washing course by automatically recognizing laundry input in the laundry treatment apparatus, and analyzing a mixture ratio of each material, and using a washing course learning model.

An AI apparatus according to an embodiment of the present disclosure detects a plurality of laundry treatment apparatuses around the AI apparatus, and compares the characteristics information of the washing group to which the laundry belongs with the characteristics information of each of the laundry treatment apparatuses and then determines the highest matching score between the characteristics information among the plurality of laundry treatment apparatuses.

An operation method of the AI apparatus according to the embodiment of the present disclosure includes detecting a plurality of laundry treatment apparatuses, acquiring characteristic information of each of the detected laundry treatment apparatuses and laundry information for laundry, determining a laundry group to which the laundry belongs, based on the acquired laundry information, comparing the characteristic information of the determined laundry group and the characteristic information of each of the plurality of laundry treatment apparatuses, determining a laundry treatment apparatus among the plurality of laundry treatment apparatuses as an apparatus for washing the laundry according to the result of the comparison, and transferring the laundry information to the determined laundry treatment apparatus.

In accordance with the present disclosure, as the optimal laundry treatment apparatus for washing the laundry is selected, the degree of the damage to the laundry can be minimized while the cleaning power thereof is maximized.

Further, in accordance with the present disclosure, the laundry treatment apparatus may be automatically selected, without the user having to select the laundry treatment apparatus to wash the laundry, thus improving user convenience.

Further, according to the embodiment of the present disclosure, when a plurality of laundry are input, an optimized washing course therefor is provided, such that the degree of the damage to the laundry can be minimized while the cleaning power thereof is maximized.

Further, according to the embodiment of the present disclosure, the user inconvenience that the user should identify the characteristics of the laundry fabrics, such as wool, cotton, cashmere, and synthetic fibers, and perform washing-rinsing-spinning settings based on the identifications prior to the washing may be removed.

Further, according to the embodiment of the present disclosure, the AI apparatus may deal with flexibly the trend of consumer interest in care of laundry during the washing, and new material development in the fashion industry, and a development of clothing made up of two or more textile materials as modified according to usage and taste.

BRIEF DESCRIPTION OF THE DRAWINGS

FIGS. 6 and 7 are views illustrating base line information according to an embodiment of the present invention.

FIG. 12 is a view showing a result of classifying main materials into three laundry groups.

FIG. 13 is a view showing a result of extracting characteristic values of a laundry group according to an embodiment of the present invention.

FIG. 25 is an illustration of an example of a matching rule model according to one embodiment of the present disclosure.

FIG. 26 is a diagram showing a score summation result for each of a plurality of external laundry treatment apparatuses according to one embodiment of the present disclosure.

FIG. 28 is an illustration of an example in which the laundry treatment apparatus outputs information about the laundry treatment apparatus to perform washing for each laundry group according to one embodiment of the present disclosure.

DETAILED DESCRIPTION OF THE EMBODIMENTS

Figure 1:
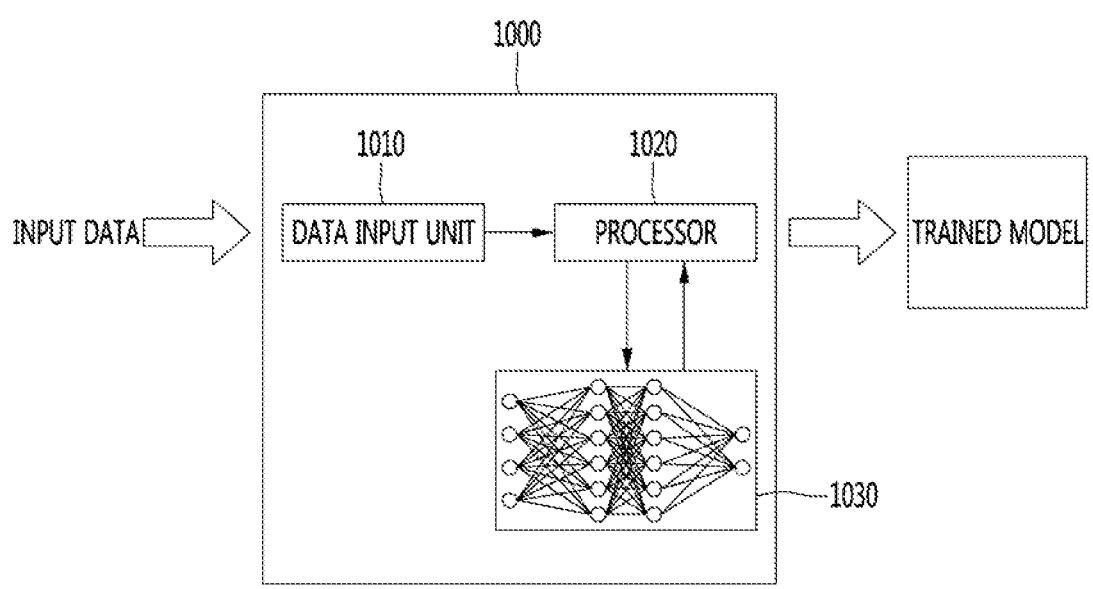
FIG. 1 is a block diagram illustrating a learning apparatus of an artificial neural network.

Exemplary embodiments of the present invention will be described below in detail with reference to the accompanying drawings in which the same reference numbers are used throughout this specification to refer to the same or like parts and a repeated description thereof will be omitted. The suffixes "module" and "unit" of elements herein are used for convenience of description and thus can be used interchangeably and do not have any distinguishable meanings or functions. In describing the present invention, a detailed description of known functions and configurations will be omitted when it may obscure the subject matter of the present invention. The accompanying drawings are used to help easily understood the technical idea of the present invention and it should be understood that the idea of the present invention is not limited by the accompanying drawings. The idea of the present invention should be construed to extend to any alterations, equivalents and substitutions besides the accompanying drawings.

It will be understood that, although the terms first, second, etc. may be used herein to describe various elements of the present invention, these terms are only used to distinguish one element from another element and essential, order, or sequence of corresponding elements are not limited by these terms.

It will be understood that when one element is referred to as being "connected to" or "coupled to" another element, one element may be "connected to" or "coupled to", another element via a further element although one element may be directly connected to or directly accessed to another element.

Artificial intelligence (AI) is a field of computer engineering and information technology involving studying how computers can think, learn and self-develop in ways similar to human intelligence, and means that computers can emulate intelligent actions of humans.

In addition, artificial intelligence does not exist by itself but is directly or indirectly associated with the other fields of computer science. In particular, many attempts have been made to introduce elements of artificial intelligence into various fields of information technology.

Machine learning is a field of artificial intelligence, which gives a computer the ability to learn without explicit programming.

Specifically, machine learning refers to technology for studying and building a system for performing learning based on empirical data, performing prediction and improving performance thereof and an algorithm therefor. Machine learning algorithms do not perform strictly defined static program commands, but rather builds a specific model to make a prediction or decision based on input data.

The term machine learning may be used interchangeably with the term machine learning.

Many machine learning algorithms have been developed based on how to classify data in machine learning. Representative examples thereof include a decision tree, a Bayesian network, a support vector machine (SVM) and an artificial neural network.

The decision tree refers to an analysis method of performing classification and prediction by plotting decision rules in a tree structure.

The Bayesian network is a model for representing conditional independence between multiple variables in a graph structure. The Bayesian network is suitable for data mining through unsupervised learning.

The SVM is a model of supervised learning for pattern recognition and data analysis and is mainly used for classification and regression analysis.

The artificial neural network (ANN) is a model of a connection relationship between neurons and the operation principle of biological neurons and is an information processing system in which a plurality of neurons such as nodes or processing elements are connected in the form of layers.

The artificial neural network (ANN) is a model used for machine learning and is a statistical learning algorithm inspired by biological neural networks (especially, the brain of the central nervous system of the animal) in machine learning and cognitive science.

Specifically, the ANN may mean a model having a problem solution ability, by changing the strength of connection of the synapses through learning at artificial neurons (nodes) forming a network by connecting synapses.

The term artificial neural network (ANN) may be used interchangeably with the term neural network.

The ANN may include a plurality of layers and each layer may include a plurality of neurons. In addition, the ANN may include synapses connecting neurons.

The ANN may be generally defined by the following three factors: (1) a connection pattern between neurons of different layers, (2) a learning process of updating the weight of a connection, and (3) an activation function for generating an output value by a weighted sum of input received from a previous layer.

The ANN may include various network models such as a deep neural network (DNN), a recurrent neural network (RNN), a bidirectional recurrent deep neural network (BRDNN), a multilayer perceptron (MLP), and a convolutional neural network (CNN), without being limited thereto.

In this specification, the term layer may be used interchangeably with the term layer.

The ANN may be classified into single-layer neural networks and multilayer neural networks according to the number of layers.

A general single-layer neural network includes an input layer and an output layer.

In addition, a general multilayer neural network includes an input layer, a hidden layer and an output layer.

The input layer receives external data, and the number of neurons of the input layer is equal to the number of input variables. The hidden layer is located between the input layer and the output layer. The hidden layer receives a signal from the input layer, and extracts and transmits characteristics to the output layer. The output layer receives a signal from the hidden layer and outputs the signal to the outside.

The input signals of neurons are multiplied by respective strengths of connection having values between 0 and 1 and then are summed. If this sum is greater than a threshold value of the neuron, the neuron is activated and an output value is obtained through an activation function.

Meanwhile, a deep neural network (DNN) including a plurality of hidden layers between an input layer and an output layer may be a representative artificial neural network for implementing deep learning which is machine learning technology.

Meanwhile, the term deep learning may be used interchangeably with the term deep learning.

The ANN may be trained using training data. Here, training may mean a process of determining parameters of the ANN using training data for the purpose of classifying, regressing or clustering input data. The representative examples of the parameters of the ANN include a weight applied to a synapse and a bias applied to a neuron.

The ANN trained using the training data may classify or cluster input data according to the pattern of the input data.

Meanwhile, the ANN trained using the training data may be referred to as a trained model in this specification.

Next, a learning method of the ANN will be described.

The learning method of the ANN may be roughly classified into supervised learning, unsupervised learning, semi-supervised learning, and reinforcement learning.

The supervised learning is a method of deriving one function from training data.

Among the derived functions, outputting consecutive values may be referred to as regression and predicting and outputting the class of an input vector may be referred to as classification.

In the supervised learning, the ANN is trained in a state in which training data is labeled.

Here, the label may mean a correct answer (or a result value) inferred by an ANN when training data is input to the ANN.

In this specification, the correct answer (or the result value) inferred by the ANN when training data is input is referred to as a label or labeling data.

In this specification, labeling training data for training the ANN is referred to as labeling training data with labeling data.

In this case, training data and a label corresponding to the training data conFIG. one training set, and the training set may be input to the ANN.

Meanwhile, the training data represents a plurality of features and labeling the training data may mean labeling the feature represented by the training data. In this case, the training data may represent the feature of an input object in the form of a vector.

The ANN may derive a function of an association between training data and labeling data using the training data and the labeling data. In addition, the ANN may determine (optimize) the parameter of the ANN through evaluation of the derived function.

The unsupervised learning is a kind of machine learning and training data is not labeled.

Specifically, the unsupervised learning may be a method of training the ANN to find and classify a pattern in the training data itself rather than the association between the training data and the label corresponding to the training data.

Examples of the unsupervised learning may include clustering and independent component analysis.

In this specification, the term clustering may be used interchangeably with the term clustering.

Examples of an ANN using unsupervised learning may include a generative adversarial network (GAN) and an autoencoder (AE).

The GAN refers to a machine learning method of improving performance through competition between two different artificial intelligence models, that is, a generator and a discriminator.

In this case, the generator is a model for generating new data and may generate new data based on original data.

In addition, the discriminator is a model for discriminating the pattern of data and may discriminate authenticity of the new data generated by the generator based on the original data.

The generator may receive and learn data which does not deceive the discriminator, and the discriminator may receive and learn deceiving data from the generator. Accordingly, the generator may evolve to maximally deceive the discriminator and to distinguish between the original data of the discriminator and the data generated by the generator.

The autoencoder (AE) is a neural network which aims to reproduce input itself as output.

The AE includes an input layer, a hidden layer and an output layer. Input data is input to the hidden layer through the input layer.

In this case, since the number of nodes of the hidden layer is less than the number of nodes of the input layer, the dimension of data is reduced and thus compression or encoding is performed.

Meanwhile, the AE controls the strength of connection of the neuron through learning, such that input data is represented by hidden-layer data. In the hidden layer, information is represented by a smaller number of neurons than the input layer, and reproducing input data as output may mean that the hidden layer finds a hidden pattern from the input data and expresses the hidden pattern.

The semi-supervised learning is a kind of machine learning and may refer to a learning method of using both labeled training data and unlabeled training data.

As one of the semi-supervised learning technique, there is a technique for inferring the label of unlabeled training data and then performing learning using the inferred label. This technique is useful when labeling cost is high.

Reinforcement learning is a theory that an agent can find the best way through experience without data when an environment in which the agent may decide what action is taken every moment is given.

Reinforcement learning may be performed by a Markov decision process (MDP).

The Markov Decision Process (MDP) will be briefly described. First, an environment including information necessary for the agent to take a next action is given. Second, what action is taken by the agent in that environment is defined. Third, a reward given to the agent when the agent successfully takes a certain action and a penalty given to the agent when the agent fails to take a certain action are defined. Fourth, experience is repeated until a future reward reaches a maximum point, thereby deriving an optimal action policy.

FIG. 1 is a block diagram illustrating a learning apparatus 1000 of an artificial neural network.

The learning apparatus 1000 of the artificial neural network may include a data input unit 1010, a processor 1020 and an artificial neural network 1030.

The data input unit 1010 may receive input data. In this case, the data input unit 1010 may receive training data or unprocessed data.

When the data input unit 1010 receives unprocessed data, the processor 1020 may preprocess the received data and generate training data capable of being input to the artificial neural network 1030.

The artificial neural network 1030 may be implemented in hardware, software or a combination thereof. If a portion or whole of the artificial neural network 1030 is implemented in software, one or more commands configuring the artificial neural network 1030 may be stored in a memory (not shown) included in the learning apparatus 1000 of the artificial neural network.

The processor 1020 may input training data or a training set to the artificial neural network 1030 to train the artificial neural network 1030.

Specifically, the processor 1020 may repeatedly train the artificial neural network (ANN) using various learning methods, thereby determining (optimizing) parameters of the artificial neural network (ANN).

The artificial neural network having the parameters determined by learning using the training data may be referred to as a trained model.

Meanwhile, the trained model may be used to infer a result value for new input data instead of the training data.

Meanwhile, the trained model may infer the result value in a state of being installed in the learning apparatus 1000 of the artificial neural network and may be transmitted to and installed in another device.

When the trained model is transmitted to another device, the learning apparatus 1000 of the artificial neural network may include a communication unit (not shown) for communication with another device.

A terminal 100 which may be used as another device will be described with reference to FIG. 2.

The terminal described in this specification may include cellular phones, smart phones, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

However, the terminal 100 according to the embodiment is applicable to stationary terminals such as smart TVs, desktop computers or digital signages.

In addition, the terminal 100 according to the embodiment of the present invention is applicable to stationary or mobile robots.

In addition, the terminal 100 according to the embodiment of the present invention may perform the function of a voice agent. The voice agent may be a program for recognizing the voice of a user and audibly outputting a response suitable to the recognized voice of the user.

The terminal 100 may include a wireless communication unit 110, an input unit 120, a learning processor 130, a sensing unit 140, an output unit 150, an interface 160, a memory 170, a processor 180 and a power supply 190.

The trained model may be installed in the terminal 100.

Meanwhile, the trained model may be implemented in hardware, software or a combination thereof. If a portion or whole of the trained model is implemented in software, one or more commands configuring the trained model may be stored in the memory 170.

The wireless communication unit 110 may include at least one of a broadcast reception module 111, a mobile communication module 112, a wireless Internet module 113, a short-range communication module 114 and a location information module 115.

The broadcast reception module 111 receives broadcast signals and/or broadcast associated information from an external broadcast management server through a broadcast channel.

The mobile communication module 112 can transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet module 113 is configured to facilitate wireless Internet access. This module may be installed inside or outside the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The short-range communication module 114 is configured to facilitate short-range communication and to support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 115 is generally configured to acquire the position (or the current position) of the mobile terminal. Representative examples thereof include a Global Position System (GPS) module or a Wi-Fi module. As one example, when the mobile terminal uses a GPS module, the position of the mobile terminal may be acquired using a signal sent from a GPS satellite.

The input unit 120 may include a camera 121 for receiving a video signal, a microphone 122 for receiving an audio signal, and a user input unit 123 for receiving information from a user.

Voice data or image data collected by the input unit 120 may be analyzed and processed as a control command of the user.

The input unit 120 may receive video information (or signal), audio information (or signal), data or user input information. For reception of video information, the mobile terminal 100 may include one or a plurality of cameras 121.

The camera 121 may process image frames of still images or moving images obtained by image sensors in a video call more or an image capture mode. The processed image frames can be displayed on the display 151 or stored in memory 170.

The microphone 122 processes an external acoustic signal into electrical audio data. The processed audio data may be variously used according to function (application program) executed in the mobile terminal 100. If desired, the microphone 122 may include various noise removal algorithms to remove noise generated in the process of receiving the external acoustic signal.

The user input unit 123 receives information from a user. When information is received through the user input unit 123, The processor 180 may control operation of the terminal 100 in correspondence with the input information.

The user input unit 123 may include one or more of a mechanical input element (for example, a mechanical key, a button located on a front and/or rear surface or a side surface of the mobile terminal 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The learning processor 130 may be configured to receive, classify, store and output information to be used for data mining, data analysis, intelligent decision, mechanical learning algorithms and techniques.

The learning processor 130 may include one or more memory units configured to store data received, detected, sensed, generated or output in a predetermined manner or another manner by the terminal or received, detected, sensed, generated or output in a predetermined manner or another manner by another component, device, terminal or device for communicating with the terminal.

The learning processor 130 may include a memory integrated with or implemented in the terminal. In some embodiment, the learning processor 130 may be implemented using the memory 170.

Selectively or additionally, the learning processor 130 may be implemented using a memory related to the terminal, such as an external memory directly coupled to the terminal or a memory maintained in a server communicating with the terminal.

In another embodiment, the learning processor 130 may be implemented using a memory maintained in a cloud computing environment or another remote memory accessible by the terminal through the same communication scheme as a network.

The learning processor 130 may be configured to store data in one or more databases in order to identify, index, categorize, manipulate, store, retrieve and output data to be used for supervised or unsupervised learning, data mining, predictive analysis or other machines.

Information stored in the learning processor 130 may be used by one or more other controllers of the terminal or the processor 180 using any one of different types data analysis algorithms and machine learning algorithms.

Examples of such algorithms include k-nearest neighbor systems, fuzzy logic (e.g., possibility theory), neural networks, Boltzmann machines, vector quantization, pulse neural networks, support vector machines, maximum margin classifiers, hill climbing, inductive logic system Bayesian networks, Petri Nets (e.g., finite state machines, Mealy machines or Moore finite state machines), classifier trees (e.g., perceptron trees, support vector trees, Marcov trees, decision tree forests, random forests), betting models and systems, artificial fusion, sensor fusion, image fusion, reinforcement learning, augmented reality, pattern recognition, and automated planning.

The processor 180 may make a decision using data analysis and machine learning algorithms and determine or predict at least one executable operation of the terminal based on the generated information. To this end, the processor 180 may request, retrieve, receive or use the data of the processor 130 and control the terminal to execute preferable operation or predicted operation of at least executable operation.

The processor 180 may perform various functions for implementing intelligent emulation (that is, a knowledge based system, an inference system and a knowledge acquisition system). This is applicable to various types of systems (e.g., a fussy logic system) including an adaptive system, a machine learning system, an artificial neural system, etc.

The processor 180 may include a sub module enabling operation involving speech and natural language speech processing, such as an I/O processing module, an environmental condition module, speech-to-text (STT) processing module, a natural language processing module, a workflow processing module and a service processing module.

Each of such sub modules may have an access to one or more systems or data and models at the terminal or a subset or superset thereof. In addition, each of the sub modules may provide various functions including vocabulary index, user data, a workflow model, a service model and an automatic speech recognition (ASR) system.

In another embodiment, the other aspects of the processor 180 or the terminal may be implemented through the above-described sub modules, systems or data and models.

In some embodiments, based on the data of the learning processor 130, the processor 180 may be configured to detect and sense requirements based on the context condition or user's intention expressed in user input or natural language input.

The processor 180 may actively derive and acquire information necessary to fully determine the requirements based on the context condition or user's intention. For example, the processor 180 may actively derive information necessary to determine the requirements, by analyzing historical data including historical input and output, pattern matching, unambiguous words, and input intention, etc.

The processor 180 may determine a task flow for executing a function for responding to the requirements based on the context condition or the user's intention.

The processor 180 may be configured to collect, sense, extract, detect and/or receive signals or data used for data analysis and machine learning operations through one or more sensing components at the terminal, in order to collect information for processing and storage from the learning processor 130.

Information collection may include sensing information through a sensor, extracting information stored in the memory 170, or receiving information from another terminal, an entity or an external storage device through a communication unit.

The processor 180 may collect and store usage history information from the terminal.

The processor 180 may determine the best match for executing a specific function using the stored usage history information and predictive modeling.

The processor 180 may receive or sense surrounding information or other information through the sensing unit 140.

The processor 180 may receive broadcast signals and/or broadcast related information, wireless signals or wireless data through the wireless communication unit 110.

The processor 180 may receive information (or signals corresponding thereto), audio signal (or signals corresponding thereto), data or user input information from the input unit 120.

The processor 180 may collect information in real time, process or classify the information (e.g., a knowledge graph, a command policy, a personalization database, a dialog engine, etc.), and store the processed information in the memory 170 or the learning processor 130.

When the operation of the terminal is determined based on data analysis and machine learning algorithms and techniques, the processor 180 may control the components of the terminal in order to execute the determined operation. The processor 180 may control the terminal according to a control command and perform the determined operation.

When the specific operation is performed, the processor 180 may analyze historical information indicating execution of the specific operation through data analysis and machine learning algorithms and techniques and update previously learned information based on the analyzed information.

Accordingly, the processor 180 may improve accuracy of future performance of data analysis and machine learning algorithms and techniques based on the updated information, along with the learning processor 130.

The sensing unit 140 may include one or more sensors configured to sense internal information of the mobile terminal, the surrounding environment of the mobile terminal, user information, and the like.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a fingerprint (finger scan) sensor, an ultrasonic sensor, an optical sensor (for example, a camera 121), a microphone 122, a battery gauge, an environment sensor (for example, a barometer, a hygrometer, a thermometer, a radiation detection sensor, a thermal sensor, and a gas sensor), and a chemical sensor (for example, an electronic nose, a health care sensor, a biometric sensor, and the like). The mobile terminal disclosed in this specification may be configured to combine and utilize information obtained from at least two sensors of such sensors.

The output unit 150 is typically configured to output various types of information, such as audio, video, tactile output, and the like. The output unit 150 may include a display 151, an audio output module 152, a haptic module 153, and an optical output module 154.

The display 151 is generally configured to display (output) information processed in the mobile terminal 100. For example, the display 151 may display execution screen information of an application program executed by the mobile terminal 100 or user interface (UI) and graphical user interface (GUI) information according to the executed screen information.

The display 151 may have an inter-layered structure or an integrated structure with a touch sensor in order to realize a touchscreen. The touchscreen may provide an output interface between the mobile terminal 100 and a user, as well as function as the user input unit 123 which provides an input interface between the mobile terminal 100 and the user.

The audio output module 152 is generally configured to output audio data received from the wireless communication unit 110 or stored in the memory 170 in a call signal reception mode, a call mode, a record mode, a voice recognition mode, a broadcast reception mode, and the like.

The audio output module 152 may also include a receiver, a speaker, a buzzer, or the like.

A haptic module 153 can be configured to generate various tactile effects that a user feels. A typical example of a tactile effect generated by the haptic module 153 is vibration.

An optical output module 154 can output a signal for indicating event generation using light of a light source of the mobile terminal 100. Examples of events generated in the mobile terminal 100 may include message reception, call signal reception, a missed call, an alarm, a schedule notice, email reception, information reception through an application, and the like.

The interface 160 serves as an interface with external devices to be connected with the mobile terminal 100. The interface 160 may include wired or wireless headset ports, external power supply ports, wired or wireless data ports, memory card ports, ports for connecting a device having an identification module, audio input/output (I/O) ports, video I/O ports, earphone ports, or the like. The terminal 100 may perform appropriate control related to the connected external device in correspondence with connection of the external device to the interface 160.

The identification module may be a chip that stores a variety of information for granting use authority of the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the first interface 160.

The memory 170 stores data supporting various functions of the terminal 100.

The memory 170 may store a plurality of application programs or applications executed in the terminal 100, data and commands for operation of the terminal 100, and data for operation of the learning processor 130 (e.g., at least one piece of algorithm information for machine learning).

The processor 180 generally controls overall operation of the terminal 100, in addition to operation related to the application program. The processor 180 may process signals, data, information, etc. input or output through the above-described components or execute the application program stored in the memory 170, thereby processing or providing appropriate information or functions to the user.

In addition, the processor 180 may control at least some of the components described with reference to FIG. 1 in order to execute the application program stored in the memory 170. Further, the processor 180 may operate a combination of at least two of the components included in the terminal, in order to execute the application program.

The power supply 190 receives external power or internal power and supplies the appropriate power required to operate respective components included in the mobile terminal 100, under control of the controller 180. The power supply 190 may include a battery, which is typically rechargeable or be detachably coupled to the terminal body for charging.

Meanwhile, as described above, the processor 180 controls operation related to the application program and overall operation of the terminal 100. For example, the processor 180 may execute or release a lock function for limiting input of a control command of the user to applications when the state of the mobile terminal satisfies a set condition.

Figure 3:
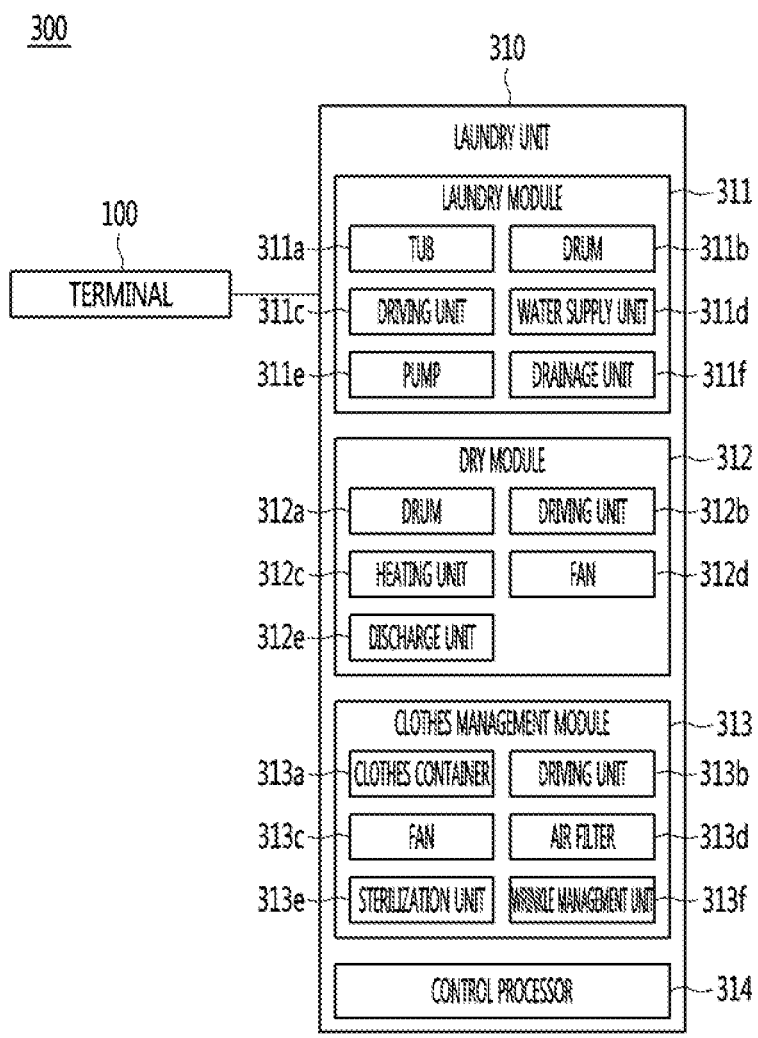
FIG. 3 is a block diagram showing the configuration of a laundry treatment device according to an embodiment of the present invention.

FIG. 3 is a block diagram showing the configuration of a laundry treatment device according to an embodiment of the present invention.

Figure 2:
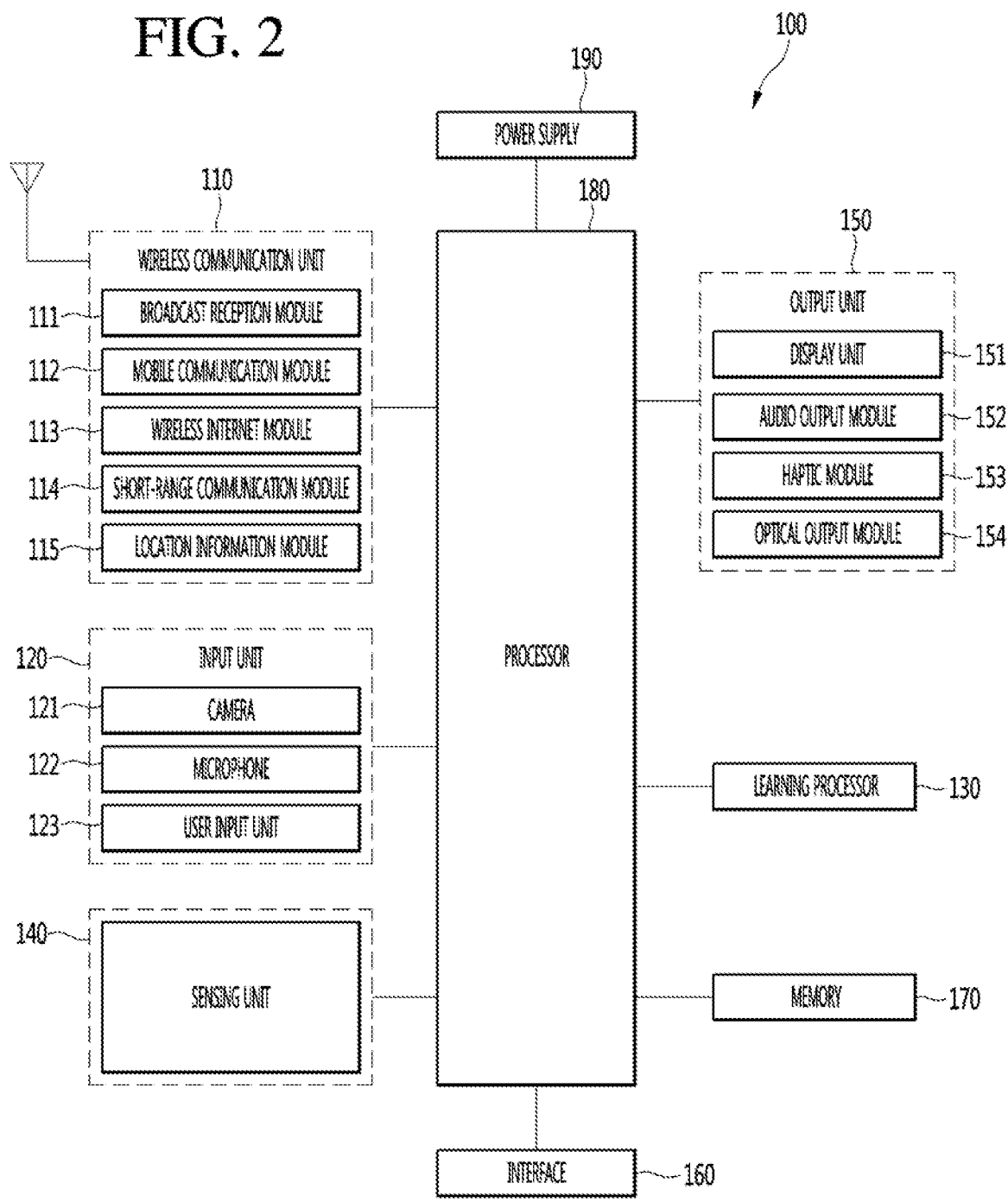
FIG. 2 is a block diagram illustrating the configuration of a terminal according to an embodiment of the present invention.

Referring to FIG. 3, the laundry treatment device 300 may include the terminal 100 shown in FIG. 2 and a laundry unit 310.

The terminal 100 may be modularized and configured as an internal component of the laundry treatment device 300.

The laundry treatment device 300 may include the internal components of the terminal 100 shown in FIG. 2 and the laundry unit 310 as parallel components.

The laundry unit 310 may include at least one of a washing module 311 for performing a function related to washing, a dry module 312 for performing a function related to dry or a clothes management module 313 for performing a function related to clothes management.

The washing module 311 may perform functions related to immersion, washing, rinsing and dehydration.

The dry module 312 may perform a function for drying laundry using various methods. Typically, laundry may be dried using wind (hot air or cold air).

The clothes management module 313 may perform functions a variety of clothes management such as clothes hanging, dry cleaning, dust removal, sterilization, wrinkle removal and ironing.

The processor 180 or a control processor 314 provided in the laundry unit 310 may control components included in the washing module 311, the dry module 312 or the clothes management module 313 of the laundry unit 310 to provide various washing functions.

The input unit 120 and the sensing unit 140 may collect data related to interaction with a user related to use and control of the laundry unit 310. For example, the input unit 120 and the sensing unit 140 may collect course selection information and control information through voice or interaction.

The output unit 150 may output information related to use and control of the laundry unit 310. For example, the output unit 150 may output course information, use record, control information, etc. corresponding to washing, drying and clothes management.

The memory 170 may store information related to use and control of the laundry unit 310. For example, the memory 170 may store course information, use record, control information, etc. corresponding to washing, drying and clothes management.

Specifically, the washing module 311 may include a tub 311a in which wash water is stored, a drum 311b rotatably mounted in the tub to have laundry put thereinto, a driving unit 311c for rotating the drum, a water supply unit 311d for supplying wash water, a pump 311e for circulating or discharging wash water, a drainage unit 311f for discharging wash water, etc.

The drum 311b in which laundry is received may be rotatably provided in the tub 311a. The drum 311b receives laundry, has an inlet located at a front surface or an upper surface thereof such that laundry is put therethrough, and rotates around a substantially horizontal or vertical rotation center line. A plurality of through-holes may be formed in the drum 311b such that water in the tub 311a flows into the drum 311b.

The terms "horizontal" or "vertical" used herein are not used in the mathematically strict sense. That is, as in the embodiment, a rotation center line inclined from the horizontal or vertical direction by a predetermined angle is close to the horizontal or vertical direction and thus may be said to be substantially horizontal or vertical.

The water supply unit 311d may include a water supply valve, a water supply pipe and a water supply hose, etc.

When water is supplied, wash water passing through the water supply valve and the water supply pipe may be mixed with a detergent in a detergent dispenser and supplied to the tub 311a through the water supply hose.

Meanwhile, a direct water supply pipe may be connected to the water supply valve such that wash water is directly supplied into the tub 311a through the direct water supply pipe without being mixed with the detergent.

The pump 311e performs functions of a drainage pump 311e for discharging wash water to the outside and a circulation pump 311e for circulating wash water. Alternatively, the drainage pump 311e and the circulation pump 311e may be separately provided.

The pump 311e may be connected to a drainage pipe provided in the drainage unit 311f to discharge wash water to the outside through the drainage pipe. In addition, the pump 311e may be connected to a circulated water supply pipe to spray wash water stored in the tub 311a into the drum 311b through the circulated water supply pipe, thereby circulating wash water.

One or more protrusions protruding toward the inside of the drum 311b may be provided on the inner surface of the drum 311b.

The protrusions may be a lifter disposed on the inner surface of the drum 311b or an integrally formed embossing. If the lifter or the embossing is formed on the inner surface of the drum 311b, the laundry may be repeatedly lifted up or down by the lifter when the drum 311b rotates.

The driving unit 311c may rotate the drum 311b, and the driving shaft rotated by the driving unit 311c may be coupled to the drum 311b through the rear surface of the tub 311a.

The driving unit 311c may include a motor capable of speed control.

At this time, the motor may be an inverter direct drive motor.

The control processor 314 may receive the output value (e.g., output current) of the motor of the driving unit 311c and control the rotation number (or the rotation speed) of the motor of the driving unit 311c to follow a predetermined target rotation number (or a target rotation speed) based on the output value. In addition, the control processor 314 may control driving of the motor of the driving unit 311c according to a driving pattern.

In addition, the dry module 312 may include a drum 312b in which laundry is put, a driving unit 312b for rotating the drum, a heating unit 312c for heating air, a fan 312d for circulating inside air, a discharge unit 312e for discharging inside air, etc.

The drum 312a is a space in which a material to be dried is dried, and is rotatably provided in a main body. In addition, the drum may be provided with one or more lifters for lifting up or down the material to be dried.

The drum 312a is connected to an intake port (not shown) and air may be introduced to the inside by the fan 312d.

The driving unit 312b may rotate the drum 312a, and the driving shaft rotated by the driving unit 312b may be coupled to the drum 312a.

The driving unit 312b may include a motor capable of speed control.

At this time, the motor may be an inverter direct drive motor.

The control processor 314 may receive the output value (e.g., output current) of the motor of the driving unit 312b and control the rotation number (or the rotation speed) of the motor of the driving unit 312b to follow a predetermined target rotation number (or a target rotation speed) based on the output value. In addition, the control processor 314 may control driving of the motor of the driving unit 312b according to a driving pattern.

The heating unit 312c may include a heating part for heating air inside the drum 312a or air introduced from the outside.

The heating part may heat air using various energy sources such as a gas type or an electric type. In the case of an electric type, a coil heater may be used.

The heating unit 312c may include a plurality of heating parts, and the heating parts may not be equal to each other, may use various energy sources, and may have different performances.

The fan 312d circulates air heated by the heating unit 312c or air in the drum 312a.

The discharge unit 312e serves to guide the air inside the drum 312a to the outside, and may include an exhaust duct, an air filter, etc.

In addition, the clothes management module 313 may include a clothes container 313a in which clothes are held, a driving unit 313b for moving a holder provided in the clothes container 313a, a fan 313c for circulating inside air, an air filter 313d, a sterilization unit 313e and a wrinkle management unit 313f.

The clothes container 313a is a space for accommodating clothes (laundry) to be managed or treated and may include a holder for holding clothes. For example, the clothes container may include a hanger or a hook for hanging the hanger or a three-dimensional structure such as a torso or a mannequin.

The clothes container 313a is connected to an intake port (not shown) and air may be introduced to the inside by the fan 313c.

The driving unit 313b may drive the holder to induce predetermined movement of clothes held by the holder.

For example, the driving unit 313b may operate such that the holder and clothes held by the holder vibrate according to a certain vibration pattern. As the held laundry vibrates, dust or foreign materials attached or adhered to clothes may be removed.

The driving unit 313b may include a motor capable of speed control.

At this time, the motor may be an inverter direct drive motor.

The control processor 314 may receive the output value (e.g., output current) of the motor of the driving unit 313b and control the rotation number (or the rotation speed) of the motor of the driving unit 313b to follow a predetermined target rotation number (or a target rotation speed) based on the output value. In addition, the control processor 314 may control driving of the motor of the driving unit 313b according to a driving pattern.

The fan 313c circulates air introduced from the outside of the clothes container 313a or air inside the clothes container 313a.

The fan 313c may be provided so as to hit the supplied air on the clothes held in the clothes container 313a or to control an air supply direction.

For example, the fan 313c may blow air onto the held clothes to separate dust attached or adhered to the clothes from the clothes or to remove the moisture of the clothes.

The air filter 313d filters out dust, etc. when the inside air of the clothes container 313a is circulated or when the inside air is discharged to the outside.

The sterilization unit 313e may include various sterilization devices for sterilizing the held clothes.

For example, the sterilization devices may include a sterilization device using ozone and a sterilization device using ultraviolet rays.

The wrinkle management unit 313f may reduce or eliminate wrinkles of the held clothes and include a steam supply unit, an iron and an ironing board.

The steam supply unit may heat supplied water to make steam and naturally supply the steam to the clothes container 313a or directly spray the steam to clothes.

The iron and the ironing board are provided inside the clothes container 313a, and operation thereof may be controlled according to ironing information determined in consideration of the shape, size and materials of clothes to be ironed.

At this time, ironing information may include the position/motion line of the iron and the ironing board, ironing temperature/time, etc.

The control processor 314 may control the driving unit 313b or a driving unit provided in the wrinkle management unit 313f to control motion of the iron and the ironing board, and control the iron and the ironing board according to ironing information.

Figure 4:
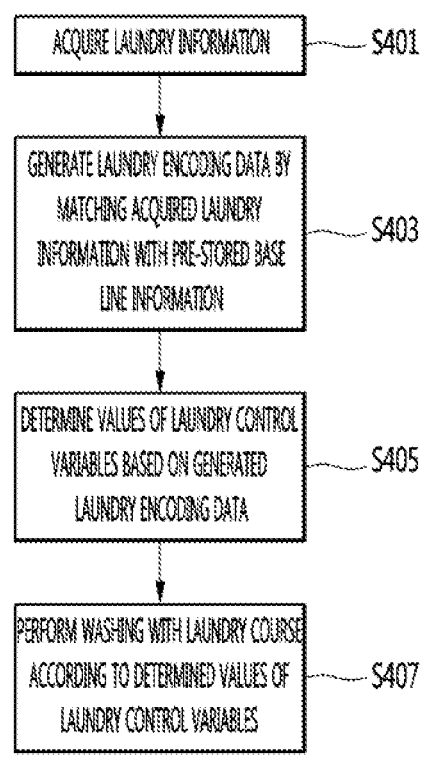
FIG. 4 is a flowchart illustrating a method of determining a laundry course of a laundry treatment device according to an embodiment of the present invention.

FIG. 4 is a flowchart illustrating a method of determining a laundry course of a laundry treatment device according to an embodiment of the present invention.

Referring to FIG. 4, the processor 180 of the laundry treatment device 300 acquires laundry information (S401).

In one embodiment, the processor 180 may acquire the laundry information of laundry based on an image captured through the camera 121.

The laundry information may include at least one of a material mixing ratio of the laundry, laundry handling precautions, or the color of laundry.

The image captured through the camera 121 may include an image of the tag attached to the laundry.

The processor 180 may recognize the text or laundry handling image included in the image of the tag to acquire the laundry information.

According to another embodiment of the present invention, if an NFC tag or an RFID tag is attached to the laundry, the processor 180 may recognize the tag through an NFC reader or an RFID reader provided therein to acquire laundry information.

In another example, if a QR code is attached to the laundry, the processor 180 may recognize the QR code to acquire the laundry information.

In addition, the processor 180 may acquire the laundry information through a sensor capable of recognizing the material of the laundry.

Figure 5:
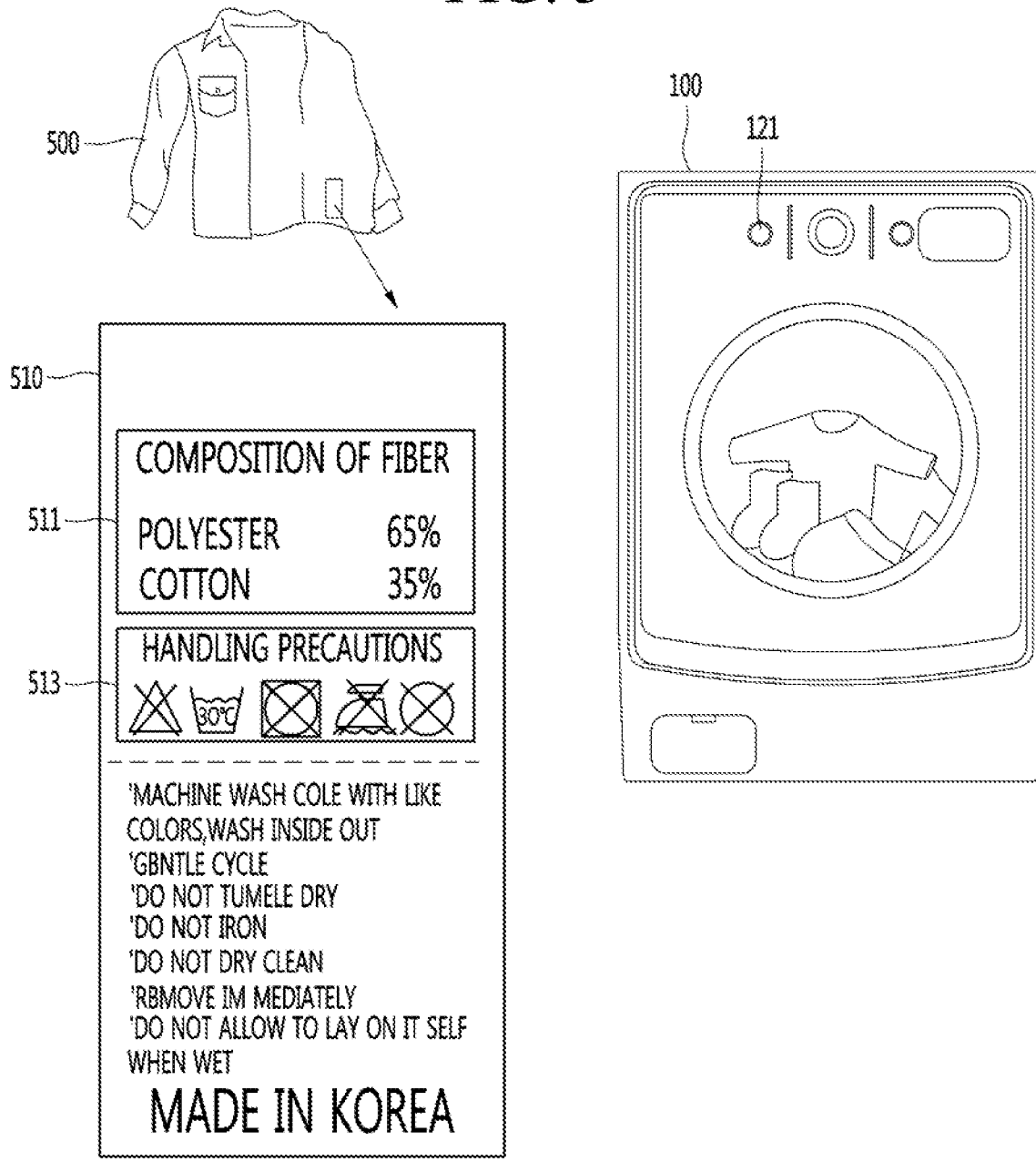
FIG. 5 is a diagram illustrating a process of acquiring laundry information using a tag image captured through a camera according to an embodiment of the present invention.

FIG. 5 is a diagram illustrating a process of acquiring laundry information using a tag image captured through a camera according to an embodiment of the present invention.

Referring to FIG. 5, a tag is attached to the laundry 500.

The tag 510 includes a material mixing ratio (or fiber composition) 511 of the laundry 500 and laundry handling images 512 indicating handling precautions.

The camera 121 of the laundry treatment device 300 may capture the image of the tag 510.

The processor 180 may recognize the captured image of the tag to acquire the laundry information including the material mixing ratio and the laundry handling images.

The processor 180 may recognize the text included in the image of the tag using an Optical Character Recognition (OCR) scheme.

The processor 180 may recognize the laundry handling image included in the image of the tag using a known image recognition algorithm.

The processor 180 may recognize a unique model number of the laundry included in the image of the tag to further acquire the color information of the laundry.

FIG. 4 will be described again.

The processor 180 of the laundry treatment device 300 generates laundry encoding data by matching the acquired laundry information with pre-stored base line information (S403).

The base line information may include one or more of a recommended laundry course of each material, quality damage when a recommended course of each material is performed, and laundry handling information of a material.

The memory 170 may store the base line information. The base line information may be periodically received from a learning device 1000 or a cloud server.

The base line information will be described with reference to FIG. 6.

FIGS. 6 and 7 are views illustrating base line information according to an embodiment of the present invention.

The base line information may include per-material laundry handling information 600 and a table 700 including a per-material recommended laundry course and quality damage.

Referring to FIG. 6, the per-material laundry handling information 600 indicating laundry handling image information of each material is shown.

The per-material laundry handling information 600 may include laundry handling images of each of a plurality of materials and text corresponding to each of the laundry handling images.

The laundry handling images of each material may be used to recognize the laundry handling images 513 included in the tag 510.

Meanwhile, the base line information may further include laundry handing information of materials other than the plurality of materials shown in FIG. 6.

Referring to FIG. 7, the table 700 including a recommended laundry course and damage corresponding to each of the plurality of materials is shown.

For example, in the case of the recommended laundry course of cotton, a washing time is 15 min, the number of rinses is 3, a dehydration intensity is high, and the water flow intensity is high. In this case, the damage of cotton may be set to 1.

According to another embodiment of the present invention, the number of times of dehydration may be used instead of the dehydration intensity, and a numerical value representing the water flow intensity may be used instead of the water flow intensity.

Damage has a range of 0 to 10 and may indicate the quality damage of a material when a recommended laundry course is performed.

The damage may be set to a high value when a material is easily damaged.

The processor 180 may compare the acquired laundry information with the base line information shown in FIGS. 6 and 7, thereby generating the laundry encoding data.

A process of generating the laundry encoding data using the acquired laundry information and the base line information will be described.

Figure 8:
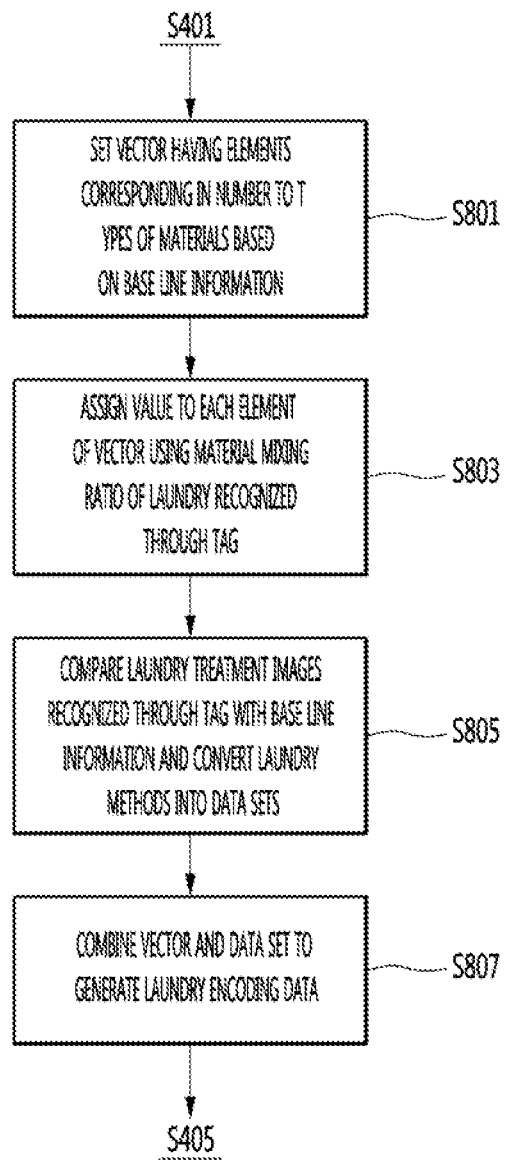
FIG. 8 is a flowchart illustrating a process of generating laundry encoding data inputtable to a learning model using base line information and laundry information recognized through a tag according to an embodiment of the present invention.

FIG. 8 is a flowchart illustrating a process of generating laundry encoding data inputtable to a learning model using base line information and laundry information recognized through a tag according to an embodiment of the present invention.

Referring to FIG. 8, the processor 180 sets a vector having elements corresponding in number to the number of types of materials based on base line information (S801).

For example, if the number of types of materials stored in the base line information is 12, the vector may have 12 elements.

In addition, the 12 elements may be pre-ordered. Here, 12 is merely an exemplary value.

The processor 180 assigns a value to each of the elements of the vector using the material mixing ratio of the laundry recognized through a tag (S803).

The processor 180 may assign a ratio value of a material to an element corresponding to each material according to the material mixing ratio.

The processor 180 compares laundry handling images recognized through the tag with the base line information and converts laundry methods into a data set (S805).

In one embodiment, the processor 180 may compare the laundry handling images with the per-material laundry handling information 600 included in the base line information and convert the laundry methods into binary data or real data.

For example, the processor 180 may convert the laundry handling image into 1 when water wash is possible and convert the laundry handling image into 0 when water wash is impossible, as the result of comparison.

In another example, the processor 180 may convert the laundry handling image into 40 when an appropriate wash water temperature is 40 □C through the laundry handling image including the appropriate wash water temperature.

The processor 180 combines the vector having the elements, to which the values are assigned, and the data set to generate laundry encoding data (S807).

Steps S801 to S807 will be described in detail with reference to FIG. 9.

Figure 9:
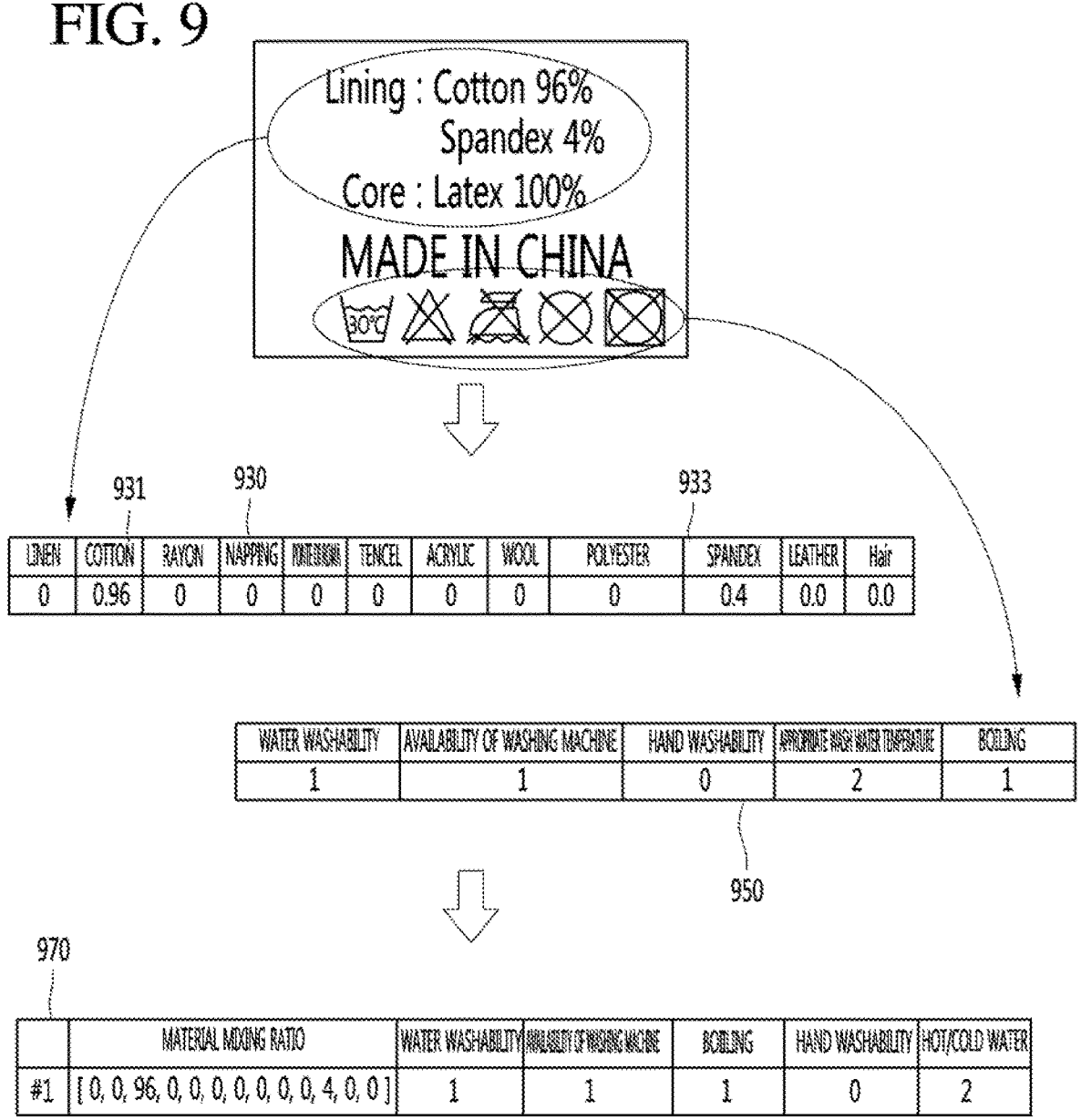
FIG. 9 is a view illustrating a detailed example of generating laundry encoding data through tag recognition according to an embodiment of the present invention.

FIG. 9 is a view illustrating a detailed example of generating laundry encoding data through tag recognition according to an embodiment of the present invention.

Referring to FIG. 9, a tag 910 may include a material mixing ratio 911 of laundry and laundry handling images 913.

The processor 180 may recognize the tag 910 to acquire the material mixing ratio 911.

If the number of types of materials stored in the base line information is 12, the processor 180 may generate a vector 930 having 12 elements, to which the material mixing ratio 911 is applied.

Specifically, if the ratio of cotton to one laundry is 95% and the ratio of spandex is 4%, 0.96 may be assigned to the cotton element 931 of the vector 930, 0.4 may be assigned to the spandex element 933, and 0 may be assigned to the other elements.

In one embodiment, if one laundry is a mixture of three or more materials, the processor 180 may assign values to the elements corresponding to two materials having the higher ratios among three or more materials.

In addition, the processor 180 may convert each of the laundry handling images 913 included in the tag 910 into binary data or real data.

For example, if a water washable image is included, the processor 180 may convert a water washable image into 1.

For example, if an appropriate wash water temperature image of 40□ C. is included, the processor 180 may convert the image into 40. The processor 180 may convert the numerical value into 2 indicating that only hot water wash is possible when the numerical value is equal to or greater than a predetermined first value.

The processor 180 may convert the numerical value into 1 indicating that cold/hot water wash is possible when the numerical value is less than the predetermined first value and is equal to or greater than a predetermined second value.

The processor 180 may convert the numerical value into 0 indicating that only cold water wash is possible when the numerical value is less than a predetermined second value.

The processor 180 may generate the laundry encoding data 970 by combining the vector 930 and the data set 950.

The laundry encoding data 970 may be used as input data of the laundry course learning model.

FIG. 4 will be described again.

The processor 180 of the laundry treatment device 300 applies a laundry course learning model to the generated laundry encoding data to determine an optimal laundry course (S405).

In one embodiment, the laundry course learning model may be a model for providing an optimal laundry course to laundry composed of a composite material.

The laundry course learning model may be a pre-learned model based on the base line information.

The laundry course learning model may be a learning model which learns optimal weights of laundry control variables using the base line information and learns values of the laundry control variables using the learned optimal weights, with respect to each of the plurality of laundry groups.

The laundry course learning model may be received from an external server such as the learning apparatus 1000 described in FIG. 1.

Hereinafter, a process of generating a laundry course learning model will be described.

Figure 10:
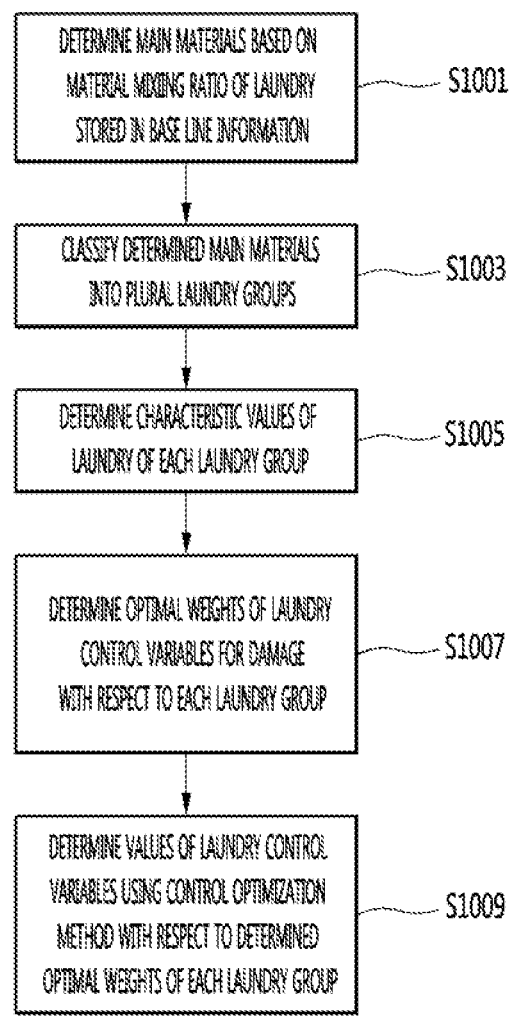
FIG. 10 is a flowchart illustrating a process of a laundry course learning model according to an embodiment of the present invention.

FIG. 10 is a flowchart illustrating a process of a laundry course learning model according to an embodiment of the present invention.

Referring to FIG. 10, the processor 180 determines a main material used to determine a laundry course based on the material mixing ratio of each laundry stored in the base line information (S1001).

In one embodiment, the processor 180 may determine a material having a largest product of the ratio of the material and the damage as a main material with respect to one laundry composed of a plurality of materials.

The base line information may be reference information for generating the laundry course learning model.

This will be described with reference to FIG. 11.

Figure 11:
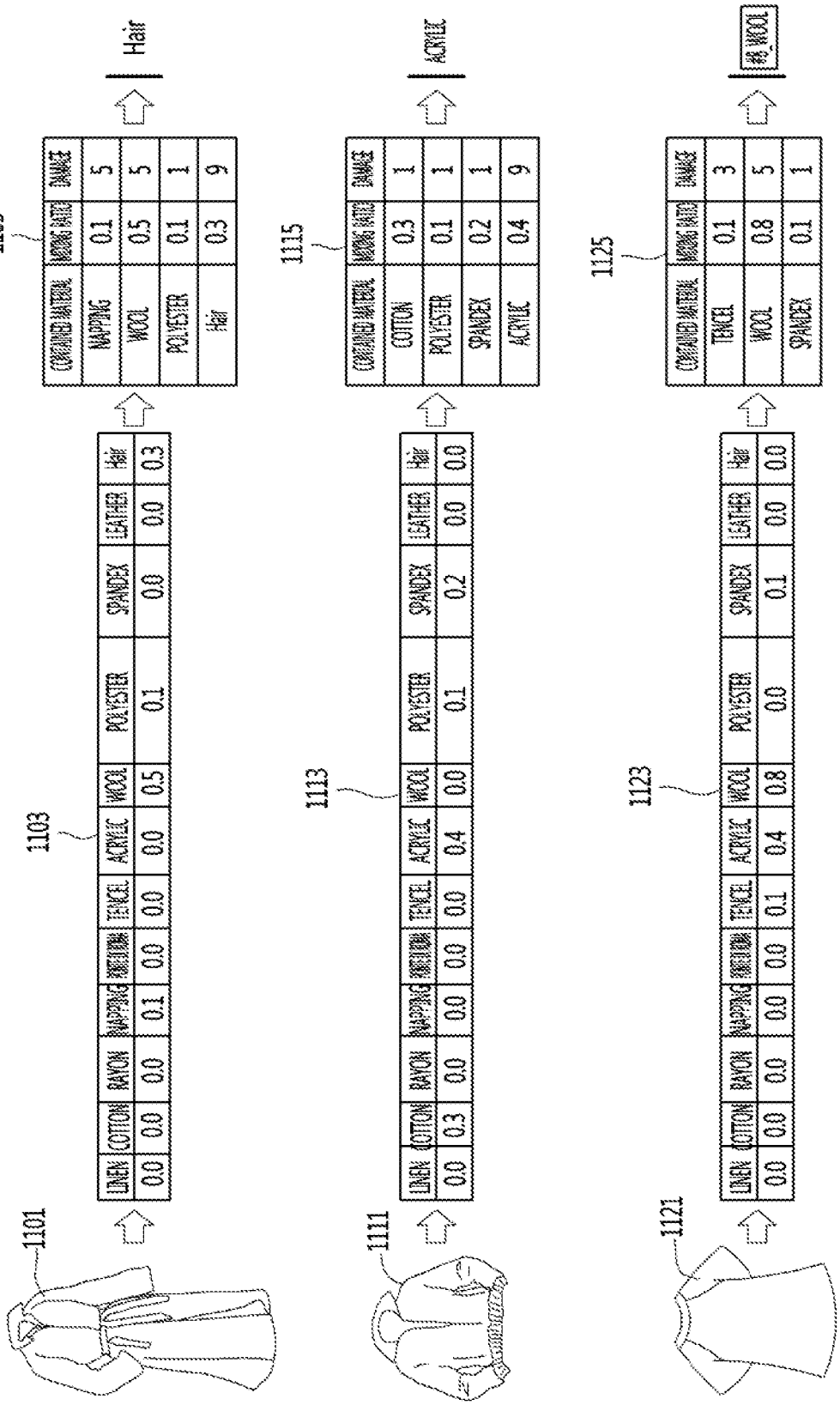
FIG. 11 is a view illustrating a process of determining a main material with respect to laundry composed of a plurality of materials according to an embodiment of the present invention.

FIG. 11 is a view illustrating a process of determining a main material with respect to laundry composed of a plurality of materials according to an embodiment of the present invention.

The base line information may include vectors including information on the material mixing ratio corresponding to each of the plurality of laundries.

Referring to FIG. 11, a first vector 930 including information on the material mixing ratio of a first laundry 1101 is shown.

The first laundry 1101 is composed of napping, wool, polyester and hair with respective ratios of 0.1, 0.5, 0.3 and 0.3.

The processor 180 may extract the damage of each material using the table 700 stored in the base line information.

The processor 180 may calculate the product of the mixing ratio of each material and the damage of the material.

Referring to FIG. 10, a first table 1105 in which the product of the mixing ratio of each material and the damage is calculated with respect to the first laundry 1101 is shown.

For example, the product of the mixing ratio and the damage of napping is 0.5 (0.1□5).

The product of the mixing ratio and the damage of wool is 2.5 (0.5□5). The product of the mixing ratio and the damage of polyester is 0.1 (0.1□1). The product of the mixing ratio and the damage of hair is 2.7 (0.3□9).

The processor 180 may determine hair corresponding to the material having a largest product of the mixing ratio and the damage as the main material of the first laundry 1101.

The processor 180 may generate a second table 1113 using a second vector 1113 including information on the material mixing ratio of a second laundry 1111 and the damage of each material.

The processor 180 may determine leather corresponding to a material having a largest product of the mixing ratio and the damage as the main material of the second laundry 1111.

The processor 180 may generate a third table 1133 using a third vector 1123 including information on the material mixing ratio of a third laundry 1121 and the damage of each material.

The processor 180 may determine wool corresponding to a largest product of the mixing ratio and the damage as the main material of the third laundry 1111.

The processor 180 may determine the main material of each laundry and label the determined main material.

FIG. 10 will be described again.

The processor 180 may classify the determined main materials into a plurality of laundry groups (S1003).

The processor 180 may classify the determined material materials into three laundry groups depending on whether water wash is possible, whether the laundry treatment device 300 is available or whether boiling is possible.

The reason why the determined main materials are classified into the plurality of laundry groups is because the damage of laundry is most influenced by whether water wash is possible, whether the laundry treatment device 300 is available or whether boiling is possible.

FIG. 12 is a view showing a result of classifying main materials into three laundry groups.

Referring to FIG. 12, a first laundry group 1210 may include materials capable of being water washed, capable of using the laundry treatment device 300 and capable of being boiled.

A second laundry group 1230 may include materials capable of being water washed, capable of using the laundry treatment device 300 and incapable of being boiled.

A third laundry group 1250 may include materials incapable of being water washed.

FIG. 10 will be described again.

The processor 180 determines the laundry characteristic values of each of the plurality of classified laundry groups (S1005).

The processor 180 may extract the laundry characteristic values of each laundry group based on the table 700 included in the base line information.

Specifically, the processor 180 may extract a washing time, the number of rises, a dehydration intensity, an appropriate water temperature, and a water flow intensity.

The processor 180 may extract a maximum value and a minimum value of the extracted washing times, a maximum value and a minimum value of the numbers of rises, a maximum level and a minimum level of the dehydration intensities, a maximum value and a minimum value of appropriate water temperatures, and a maximum level and a minimum level of water flow intensities.

The processor 180 may determine the extracted results as the characteristic values of the laundry group.

FIG. 13 is a view showing a result of extracting characteristic values of a laundry group according to an embodiment of the present invention.

Referring to FIG. 13, a first characteristic value table 1310 including the characteristic values of a first laundry group 1210 and a second characteristic value table 1330 including the characteristic values of a second laundry group 1230 is shown.

In the first characteristic value table 1310, a maximum washing time is 12 minutes, a minimum washing time is 9 minutes, the maximum number of rinses is 2, the minimum number of rinses is 2, the maximum and minimum dehydration intensities are low, the maximum appropriate water temperature is hot/cold, the minimum appropriate water temperature is cold, the maximum water flow intensity is medium and the minimum water flow intensity is low.

In the second characteristic value table 1330, a maximum washing time is 17 minutes, a minimum washing time is 15 minutes, the maximum number of rinses is 3, the minimum number of rinses is 3, the maximum and minimum dehydration intensities are high, the maximum appropriate water temperature is hot, the minimum appropriate water temperature is hot, the maximum water flow intensity is high and the minimum water flow intensity is high.

FIG. 10 will be described again.

The processor 180 determines optimal weights of the laundry control variables for the damage of each laundry group using a deep learning algorithm (S1007).

The processor 180 may determine optimal weights, in which the value of a loss function is minimized, with respect to each laundry group, using a loss function.

Minimization of the value of the loss function may mean that a difference between actual damage and estimated damage is minimized.

The loss function may be expressed as shown in Equation 1 below.

$$\pounds(x;W,b) = \|y-(Wx+b)\|^2 \quad \text{[Equation 1]}$$

y denotes an actual damage vector indicating actual damage, x denotes a laundry control variable vector including laundry control variables for determining a laundry course, W denotes a weight vector indicating the extent to which each laundry control variable influences damage, and b denotes an external-factor damage vector due to external factors other than the laundry control variables.

The external-factor damage set may be pre-stored in the base line information.

In particular, W may be a vector including weights of 5 laundry control variables of each of N laundry groups.

(Wx+b) indicates estimated damage capable of best describing the actual damage y, and an object of the loss function L(x;W,b) is to obtain a weight set for minimizing a difference between the actual damage and the estimated damage.

Figure 14:
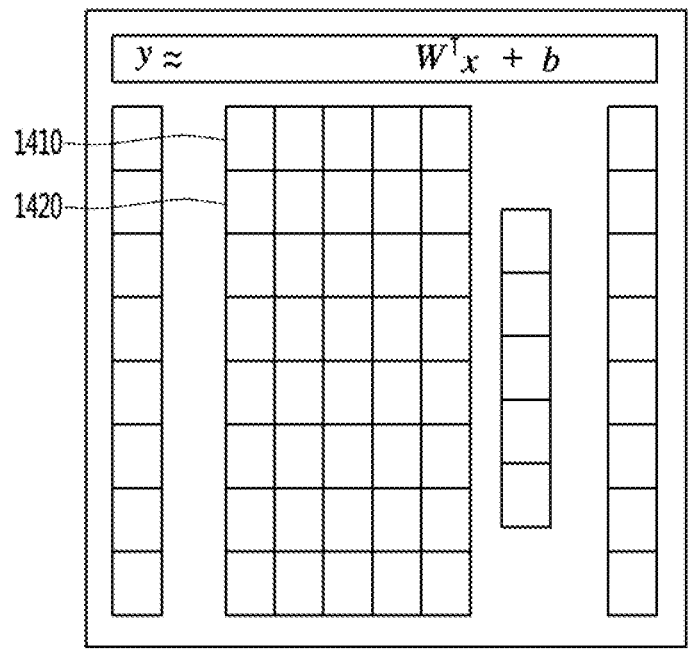
FIG. 14 is a view showing an actual damage y and estimated damage (Wx+b) expressed in a matrix.

The actual damage y and the estimated damage (Wx+b) may be expressed as shown in FIG. 14.

FIG. 14 is a view showing actual damage y and estimated damage (Wx+b) expressed in a matrix.

In particular, W may include a plurality of weight sets respectively corresponding to the plurality of laundry groups.

For example, the first weight set 1410 includes weights corresponding to the laundry control variables of the first laundry group 1210.

The second weight set 1420 includes weights corresponding to the laundry control variables of the second laundry group 1220.

Step S1007 will be described again.

The laundry control variable set may include a washing time variable $x_1$ indicating a washing time, a number-of-rinses variable $x_2$ indicating the number of rinses, a number-of-times-of-dehydration variable $x_3$ (or dehydration intensity) indicating the number of times of dehydration or a dehydration intensity, a wash water temperature variable $x_4$ indicating a wash water temperature and a water flow intensity variable x5 indicating a water flow intensity.

The processor 180 may determine (or learn) a weight set for minimizing the value of the loss function, using a deep learning algorithm or a gradient descent method, using the washing time, the number of rinses, the number of times of dehydration, the water flow intensity, the appropriate water temperature, the actual damage and the external-factor damage of each material included in the base line information as input data.

Here, the deep learning algorithm may be any one of supervised learning or meta learning, but this is merely an example.

In addition, a gradient descent method such as multi-layer perception (MLP) may be used to determine optimal weights, but this is merely an example.

In addition, when the user uses the laundry treatment device 300, newly input laundry information may be accumulated and learned, thereby evolving the weights.

The processor 180 may acquire an optimal weight set including weights corresponding to each laundry group for minimizing the loss function.

For example, the processor 180 may acquire a first optimal weight set corresponding to the first laundry group 1210 and a second optimal weight set corresponding to the second laundry group 1230.

The processor 180 may determine values of the laundry control variables using a control optimization scheme with respect to the optimal weights corresponding to each laundry group (S1009).

The processor 180 may minimize the damage of the laundry with respect to an objective function using a Hamiltonian based control optimization scheme and determine values of laundry control variables for maximizing washing capacity.

In the Hamiltonian based control optimization scheme, the objective function may be expressed by Equation 2 below.

$$\mathcal{J}(x) = \|(Wx+b)\|^2 + \lambda_1 \left( \sum_{i=1}^{5} \varphi(x_i - x_i^{max}) \right) + \lambda_2 \left( \sum_{i=1}^{5} \varphi(x_i^{min} - x_i) \right),$$

$$\varphi(z) = \begin{pmatrix} z, & \text{if } z > 0 \\ 0, & \text{otherwise} \end{pmatrix}$$

[Equation 2]

W corresponds to a laundry group and may indicate the weight sets determined in step S1007.

Xi may indicate a laundry control variable.

x1 denotes a variable indicating a washing time, x2 denotes a variable indicating the number of rinses, x3 denotes a variable indicating the number of times of dehydration or a dehydration intensity, x4 denotes a variable indicating wash water temperature, and x5 denotes a variable indicating a water flow intensity.

λ is a Lagrangian coefficient constant.

$x_i^{max}$ may indicate the maximum value of the laundry control variable within one laundry group or a plurality of laundry groups.

$x_i^{max}$ may be obtained from the characteristic values of each laundry group shown in FIG. 13.

If the plurality of laundries is recognized by the laundry treatment device 300 and is classified into a plurality of laundry groups, $x_i^{max}$ may indicate the maximum value of the laundry control variable within the plurality of laundry groups.

$x_i^{max}$ may give constraints for obtaining an optimal laundry course within a recommended laundry course category that guarantees damage.

$x_1^{max}$ may indicate a maximum washing time within one laundry group or a maximum washing time within a plurality of laundry groups.

$x_2^{max}$ may indicate a maximum number of rinses within one laundry group or a maximum number of rinses within a plurality of laundry groups.

$x_3^{max}$ may indicate a maximum number of times of dehydration (or intensity) within one laundry group or a maximum number of times of dehydration (or intensity) within a plurality of laundry groups.

$x_4^{max}$ may indicate a maximum wash water temperature within one laundry group or a maximum wash water temperature within a plurality of laundry groups.

$x_5^{max}$ may indicate a maximum water flow intensity within one laundry group or a maximum water flow intensity within a plurality of laundry groups.

$x_i^{min}$ may indicate a maximum value of a laundry control variable within one laundry group or within a plurality of laundry groups.

$x_i^{min}$ may be obtained from the characteristic values of each laundry group shown in FIG. 13.

If the plurality of laundries is recognized by the laundry treatment device 300 and is classified into a plurality of laundry groups, $x_i^{min}$ may indicate the minimum value of the laundry control variable within the plurality of laundry groups.

$x_i^{min}$ may give constraints for obtaining an optimal laundry course within a recommended laundry course category that guarantees washing capacity.

$x_1^{min}$ may indicate a minimum washing time within one laundry group or a minimum washing time within a plurality of laundry groups.

$x_2^{min}$ may indicate a minimum number of rinses within one laundry group or a minimum number of rinses within a plurality of laundry groups.

$x_3^{min}$ may indicate a minimum number of times of dehydration (or intensity) within one laundry group or a minimum number of times of dehydration (or intensity) within a plurality of laundry groups.

$x_4^{min}$ may indicate a minimum wash water temperature within one laundry group or a minimum wash water temperature within a plurality of laundry groups.

$x_5^{min}$ may indicate a minimum water flow intensity within one laundry group or a minimum water flow intensity within a plurality of laundry groups.

$\phi(x_i - x_i^{max})$ is a maximum constraint function for giving constraints to find an optimal value within the maximum value of the laundry control variables.

$\phi(x_i^{min} - x_i)$ is a minimum constraint function for giving constraints to find an optimal value within the minimum value of the laundry control variables.

If only the above-described loss function is used, since an optimal value is obtained as a non-applicable result value in a process of finding the optimal values of the laundry control values, the range of the values of the laundry course control variables may be limited as the objective function is used.

The determined values of the laundry control variables may be used to perform the optimal laundry course of the laundry put into the laundry treatment device 300.

Meanwhile, if $x_i^{min}$ is greater than $x_i^{max}$, the objective function may be replaced with Equation 3 below.

$$\mathcal{J}(x) = \|Wx+b\|^2 + \lambda\left(\sum_{i=1}^{5} \varphi(x_i - (x_i^{max} + x_i^{min})/2)\right),$$ [Equation 3]

$$\varphi(z) = \begin{pmatrix} z, & \text{if } z > 0 \\ 0, & \text{otherwise} \end{pmatrix}$$

Equation 3 is another objective function for giving constraints for limiting the value to approximate the average value thereof when $x_i^{min}$ is greater than $x_i^{max}$, and may be used instead of Equation 2 including the maximum constraint function and the minimum constraint function.

Figure 15:
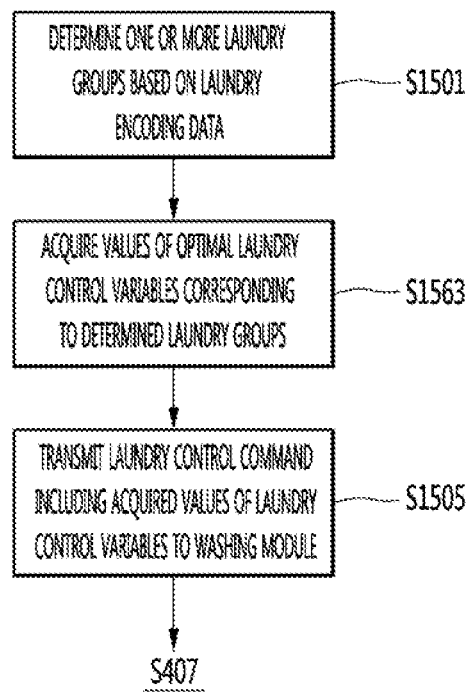
FIG. 15 is a view illustrating a process of acquiring values of laundry control variables for an optimal laundry course by applying a laundry course learning model to laundry encoding data according to an embodiment of the present invention.

FIG. 15 is a view illustrating a process of acquiring the values of laundry control variables for an optimal laundry course by applying a laundry course learning model to laundry encoding data according to an embodiment of the present invention.

Referring to FIG. 15, the processor 180 determines one or more laundry groups based on the laundry encoding data generated in step S403 (S1501).

The processor 180 may determine a laundry group, to which a laundry belongs, using the material mixing ratio included in the laundry encoding data 900 shown in FIG. 9.

In another embodiment, if a plurality of laundries is put into the laundry treatment device 300, the processor 180 may acquire the laundry encoding data of each of the plurality of laundries.

The processor 180 may determine a laundry group, to which each of the plurality of laundries belongs, based on the laundry encoding data corresponding to each of the plurality of laundries.

The processor 180 acquires the values of the laundry control variables corresponding to the determined one or more laundry groups (S1403).

The processor 180 may determine an optimal weight set corresponding to each laundry group through step S1007.

The processor 180 may apply the characteristic values of the determined laundry group and the determined optimal weights to the objective function shown in Equation 2, thereby acquiring the values of the laundry control variables, which enable the value of the objective function to be minimized.

In one embodiment, when the plurality of laundries is classified into a plurality of laundry groups, the processor 180 may apply the characteristic value sets of the plurality of laundry groups and the weight sets to the objective function, thereby acquiring the values of the laundry control variables, which enable the value of the objective function to be minimized.

The processor 180 transmits a laundry control command including the acquired values of the laundry control variables to the washing module 311 (S1405).

The washing module 311 may perform washing, to which the values of the laundry control variables are applied, according to the laundry control command received from the processor 180.

FIG. 4 will be described again.

The processor 180 of the laundry treatment device 300 performs washing with the laundry course according to the determined values of the laundry control variables (S407)

This will be described with reference to FIG. 16.

Figure 16:
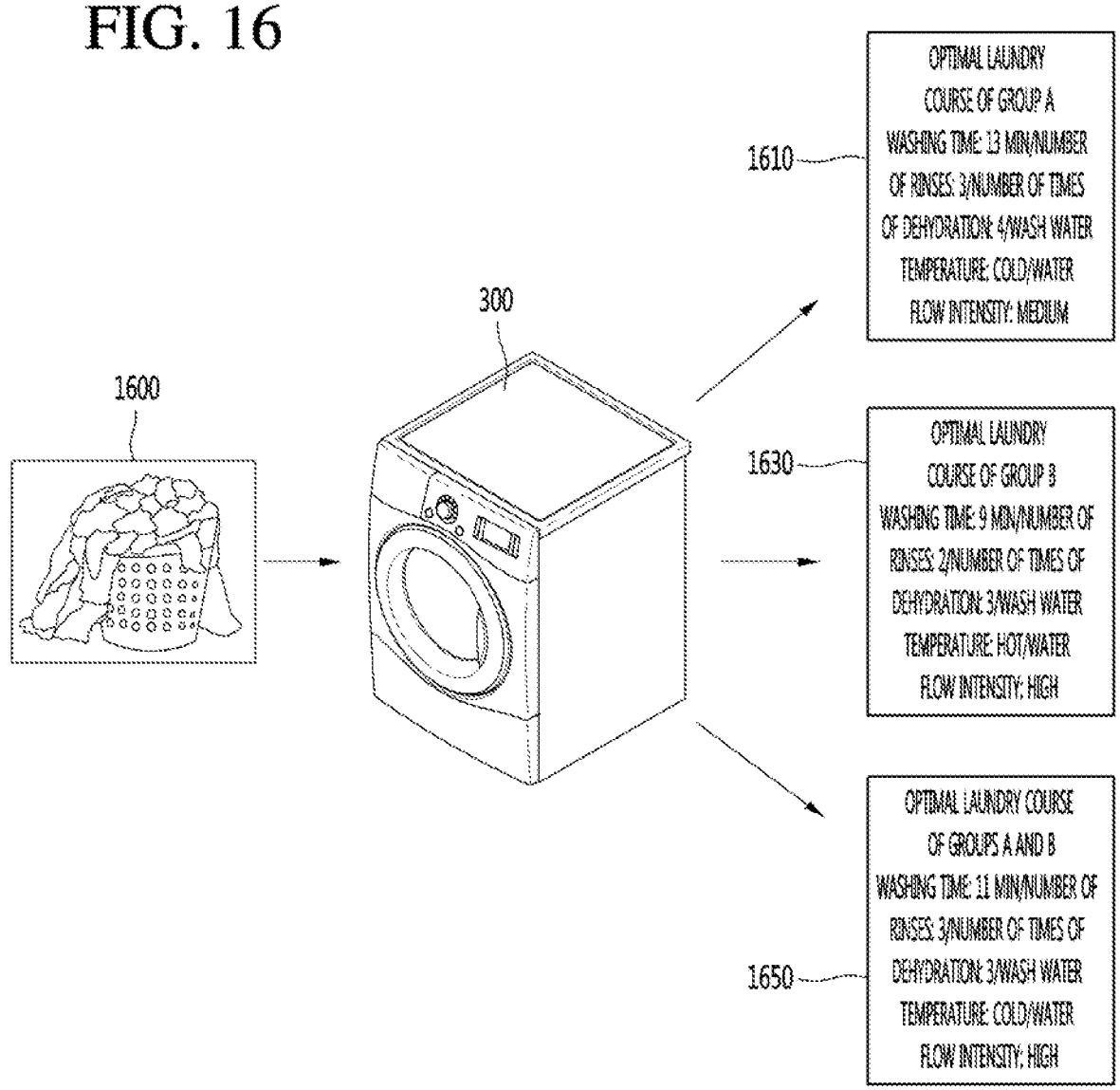
FIG. 16 is a view illustrating a scenario in which an optimal laundry course is automatically recommended when laundry is put into a laundry treatment device according to an embodiment of the present invention.

FIG. 16 is a view illustrating a scenario in which an optimal laundry course is automatically recommended when laundry is put into a laundry treatment device 300 according to an embodiment of the present invention.

Referring to FIG. 16, a plurality of laundries 1600 may be put into the laundry treatment device 300.

The laundry treatment device 300 may recognize the tag of the laundry through the camera (not shown) provided in the laundry treatment device 300 to acquire laundry information.

The laundry treatment device 300 may convert the laundry information into laundry encoding data and apply the converted laundry encoding data to the laundry course learning model, thereby providing an optimal laundry course.

The laundry treatment device 300 may receive the laundry encoding data as input data and acquire the value of the laundry control variables corresponding to the optimal laundry course using a pre-learned weight set.

The laundry treatment device 300 may control the washing module 311 to wash the plurality of laundries 1600 with a laundry course corresponding to the acquired values of the laundry control variables.

For example, if the plurality of laundries 1600 belongs to Group A (the first laundry group 1210 of FIG. 12), the laundry treatment device 300 may acquire a laundry course in which a washing time is 13 minutes, the number of rinses is 3, the number of times of dehydration is 4, the wash water temperature is cold water and the water flow intensity is medium.

In another example, if the plurality of laundries 1600 belongs to Group B (the second laundry group 1230 of FIG. 12), the laundry treatment device 300 may acquire a laundry course in which a washing time is 9 minutes, the number of rinses is 2, the number of times of dehydration is 3, the wash water temperature is hot water and the water flow intensity is high.

If the plurality of laundries 1600 belongs to Group A or B, the laundry treatment device 300 may design a laundry course in which a washing time is 11 minutes, the number of rinses is 3, the number of times of dehydration is 3, the wash water temperature is cold water and the water flow intensity is medium.

Therefore, the user can obtain a laundry result in which damage of the plurality of laundries is minimized and washing capacity is maximized, by recognizing the tags of a plurality of laundries having different materials.

Figure 17:
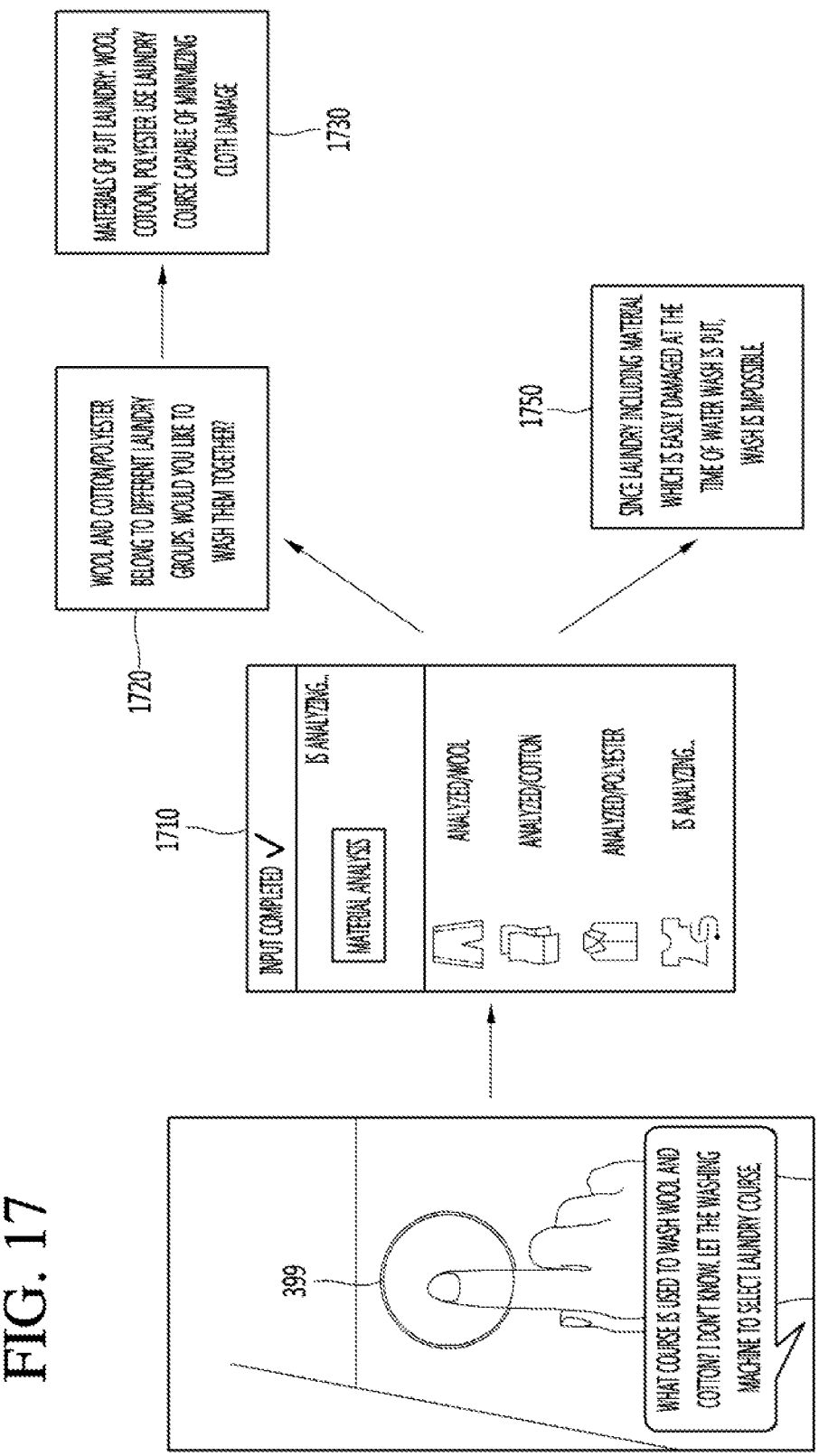
FIG. 17 is a view illustrating a user scenario for providing an optimal laundry course according to an embodiment of the present invention.

FIG. 17 is a view illustrating a user scenario for providing an optimal laundry course according to an embodiment of the present invention.

Referring to FIG. 17, the laundry treatment device 300 may include an artificial laundry button 399.

The artificial laundry button 399 may automatically recommend an optimal laundry course when a plurality of laundries is put into the laundry treatment device 300.

When the plurality of laundries is put into the laundry treatment device 300 and the artificial laundry button 399 is selected, the laundry treatment device 300 may display a material analysis screen 1710 for analyzing the materials of the laundries.

The laundry treatment device 300 may convert laundry information into encoding data and determine the materials of the laundry using the converted encoding data.

The laundry treatment device 300 may transmit information on the material analysis screen 1710 to the mobile terminal 100. In this case, the material analysis screen 1710 may be displayed on the mobile terminal 100 of the user.

If materials of different laundry groups are detected, the laundry treatment device 300 may display a notification message 1720 informing the user that the materials of different laundry groups are detected and asking whether to wash the laundries together or separately.

The notification message 1720 may be output through the audio output unit 152.

The notification message 1720 may be transmitted to the mobile terminal 100 and displayed on the mobile terminal 100.

When input of washing the laundries of the different laundry groups together is received, the laundry treatment device 300 may determine the values of the laundry control variables based on the laundry encoding data.

The laundry treatment device 300 may display a progress message 1730 indicating that a laundry course corresponding to the determined values of the laundry control variables is in progress.

The progress message 1730 may be output through the audio output unit 152 or transmitted to the mobile terminal 100 to be displayed on the mobile terminal 100.

Meanwhile, when laundry having a material which cannot be water-washed or must be dry-cleaned is detected as the result of analyzing the materials of the laundries, the laundry treatment device 300 may output a warning message 1750 indicating that washing is impossible.

The warning message 1750 may be output through the audio output unit 152 or transmitted to the mobile terminal 100 to be displayed on the mobile terminal 100.

The user may be guided to determine how to appropriately wash laundries through the warning message 1750.

According to the embodiments of the present invention, when a plurality of laundries is put, an optimized laundry course is provided, thereby minimizing damage of the laundries and improving washing capacity.

In addition, it is possible to reduce user's efforts to grasp the characteristics of cloth such as wool, cotton, cashmere and synthetic fiber to set washing, rinsing dehydration conditions before washing.

In addition, it is possible to flexibly cope with tendency of consumers who are interest in clothes care before and after washing and development of clothes made of two or more materials due to development of new materials in the fashion industry and modification of various types of fibers according to usage and preference.

Figure 18:
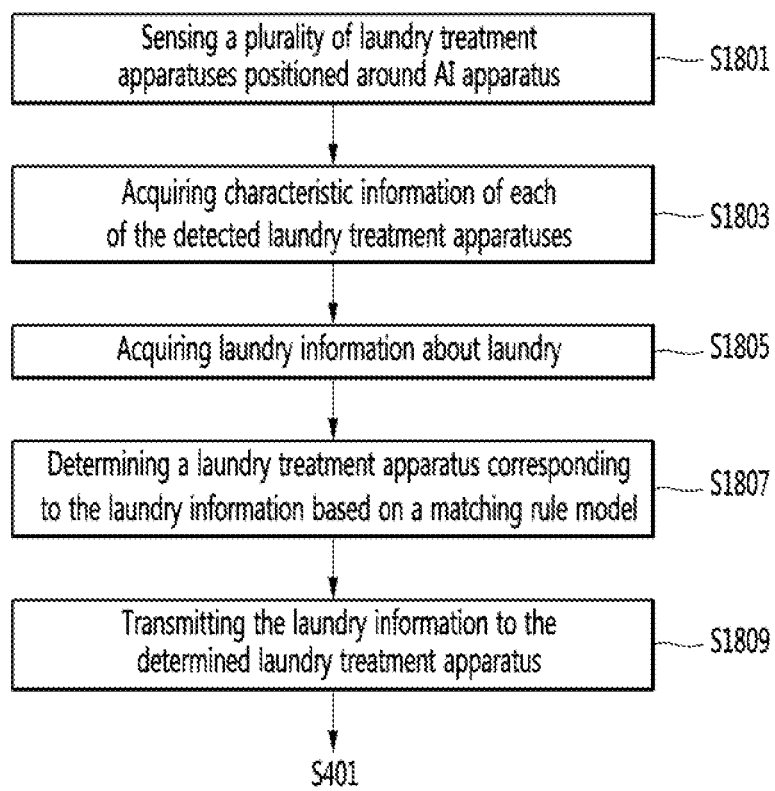
FIG. 18 is a flow chart for describing the operation method of the laundry treatment apparatus according to another embodiment of the present disclosure.

FIG. 18 is a flow chart for describing the operation method of the laundry treatment apparatus according to another embodiment of the present disclosure.

A processor 180 of the laundry treatment apparatus 300 senses a plurality of external laundry treatment apparatuses positioned around the apparatus 300 (S1801).

The processor 180 may use the short-range communication module 114 to detect the presence of a plurality of external laundry treatment apparatuses positioned in the vicinity thereto.

The processor 180 may detect external laundry treatment apparatuses positioned within a certain distance from the processor 180.

The processor 180 may use the short-range communication module 114 to transmit a request signal requesting identification information of an apparatus outwardly in a broadcasting scheme. In response to the transmitted request signal, the external laundry treatment apparatuses may send a response signal including apparatus identification information to the processor 180.

The processor 180 may recognize an external laundry treatment apparatus positioned around the processor 180 using the identification information included in the received response signal. The identification information may include one or more of the model name of the apparatus and the name of the apparatus.

The processor 180 acquires the characteristic information of each of the detected plurality of external laundry treatment apparatuses (S1803).

The characteristic information of the external laundry treatment apparatus may include at least one of capacity, boiling ability, steam capability, small washing ability, cleaning power, average damage, power consumption.

The cleaning power and the average degree of damage of the external laundry treatment apparatus may be based on statistical values that could be obtained using the experiment when developing the apparatus.

In particular, the average degree of damage may be a relative value.

The processor 180 may use the model name of the detected external laundry treatment apparatus to obtain the characteristic information of the external laundry treatment apparatus.

The processor 180 sends the model name of the external laundry treatment apparatus to the cloud server and may receive the characteristic information of the external laundry treatment apparatus from the cloud server.

This will be described with reference to FIG. 19.

Figures 19, 20:
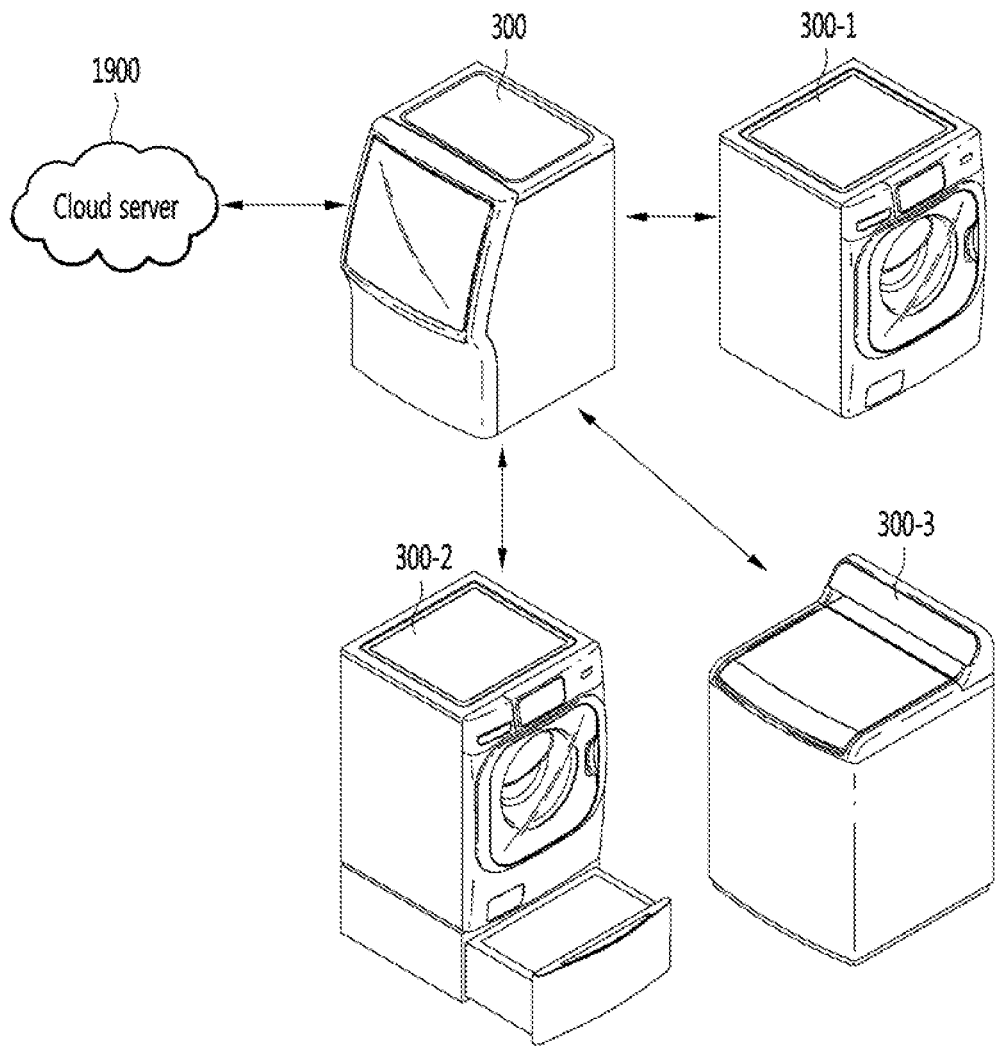
FIG. 19 is a diagram describing a process of a laundry treatment apparatus to acquire characteristic information of an external laundry treatment apparatus according to one embodiment of the present disclosure.
FIG. 20 is a diagram including the characteristic information of external laundry treatment apparatuses according to an embodiment of the present disclosure.

FIG. 19 is a diagram describing the process of the laundry treatment apparatus to obtain the characteristic information of an external laundry treatment apparatus according to one embodiment of the present disclosure.

The laundry treatment apparatus 300 may detect the presence of external laundry treatment apparatuses 300-1 to 300-3 positioned within a certain distance thereto.

The laundry treatment apparatus 300 may act as a manager for managing other external laundry treatment apparatuses 300-1 to 300-3 according to a user's request.

The manager detects the external laundry treatment apparatus, and collects identification information of the detected external laundry treatment apparatus. Further, the manager collects laundry information corresponding to laundry. The manager may serve to determine the laundry treatment apparatus to wash the laundry.

The laundry treatment apparatus 300 may receive the model name of each of the external laundry treatment apparatuses 300-1 to 300-3 therefrom.

The laundry treatment apparatus 300 may send a characteristic information request including the received model names to the cloud server 1900 using the wireless Internet module 113.

The cloud server 1900 may extract characteristic information corresponding to each model name in response to the characteristic information request received from the laundry treatment apparatus 300.

The cloud server 1900 may store characteristic information corresponding to each of the laundry treatment apparatuses.

The laundry treatment apparatus 300 may receive characteristic information of each of the external laundry treatment apparatuses 300-1 to 300-3 from the cloud server 1900.

The cloud server 1900 may be the learning apparatus 1000 shown in FIG. 1. However, this is only an example. In another example, the cloud sever 1900 may be a separate apparatus from the learning apparatus 1000.

In one example, the laundry treatment apparatus 300 may store the characteristic information of each of a plurality of external laundry treatment apparatuses in the memory 170 in correspondence with the model name. In this case, the laundry treatment apparatus 300 searches the memory 170 without having to transmit the model name of the received external laundry treatment apparatus to the cloud server 1900 and thus may acquire the characteristic information of the corresponding external laundry treatment apparatus from the memory 170.

In one example, each of the first to third external laundry treatment apparatuses 300-1 to 300-3 may include all of the components shown in FIG. 3.

FIG. 20 is a diagram that includes characteristic information of external laundry treatment apparatuses according to an embodiment of the present disclosure.

Referring to FIG. 20, the characteristic information of each of the external laundry treatment apparatuses which the laundry treatment apparatus 300 has collected is shown.

The boiling function modes may be 3 modes, that is, X/O/Δ.

X may be a boiling non-available mode. O may be a boiling available mode. Δ may indicate that the boiling function is selectively available depending on the type of laundry.

The steaming function modes may be 2 modes, that is, X/O.

X may be a steaming non-available mode. O may be a steaming available mode.

The small amount washing function modes may be 2 modes, that is, X/O.

X may be a small amount washing non-available mode. O may be a small amount washing available mode. In this connection, a small amount may represent the preset weight of the laundry.

The cleaning force may have a value from 0 to 5. The cleaning force represents the cleaning degree of the laundry and may be a relative value.

The average degree of damage may have a value from 0 to 5. The average degree of damage indicates the average value of laundry damage during laundry washing. Further, the damage degree may be a relative value.

The power consumption represents the power consumed by each external laundry treatment apparatus.

Again, FIG. 18 will be described.

Then, the processor 180 acquires laundry information including information on laundry (S1805).

The laundry information may include one or more of the following: material mixed ratio of laundry, washing instructions, and color of laundry.

The processor 180 may use camera 121 to take a tag image attached to laundry. From the photographed tag image, laundry information can be acquired by the processor.

Specifically, the processor 180 may recognize the text or laundry-handling image included in the tag image to acquire laundry information. This is illustrated in FIG. 5.

As another example, When an NFC tag or RFID tag is attached to laundry, the processor 180 may acquire laundry information by recognizing the corresponding tag using an NFC reader or an RFID reader installed in itself.

In one example, the processor 180 may determine the laundry washing group based on the acquired washing information.

The process to determine the washing group of laundry may employ the embodiment of FIG. 11 and FIG. 12.

The processor 180 determines, based on the matching rule model, a laundry treatment apparatus corresponding to the acquired laundry information among the plurality of external laundry treatment apparatuses (S1807).

In one embodiment, the matching rule model may be a model that matches the laundry group and the laundry treatment apparatus that is best suitable for the laundry group with each other.

The matching rule model may be a model for matching or determining any external laundry treatment apparatus to perform the laundry washing using the characteristic information of the laundry group and the characteristic information of the external laundry treatment apparatus.

Specifically, the matching rule model may be a model that determines the external laundry treatment apparatus to perform laundry washing by calculate the score according to the matching result between the characteristic elements of the laundry group and the characteristic elements of the external laundry treatment apparatus.

The matching rule model may be received from the learning apparatus 1000 and stored in memory 170.

In another example, the matching rule model may be a model obtained by the learning processor 130 or the processor 180 of the laundry treatment apparatus 300.

Figure 21:
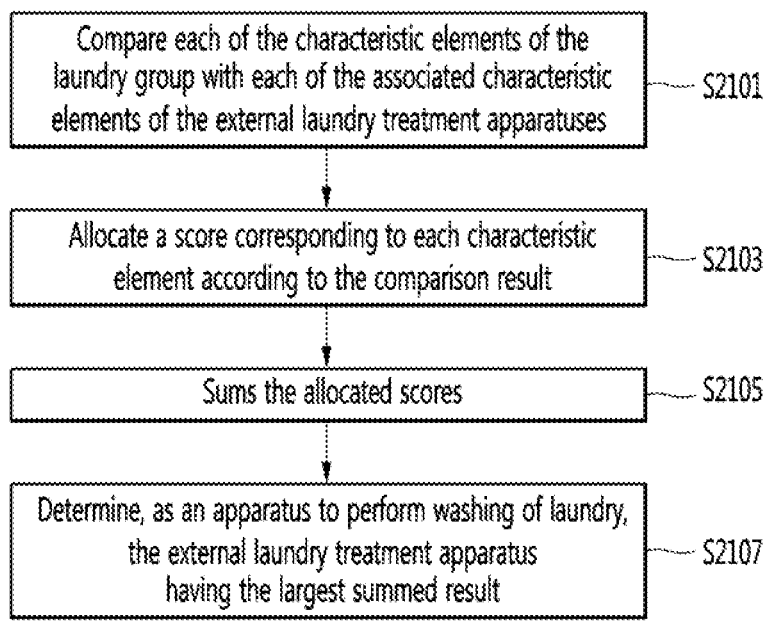
FIG. 21 is a flow chart for describing a process to determine an external laundry treatment apparatus using a matching rule model according to one embodiment of the present disclosure.

FIG. 21 is a flow chart for describing a process to determine an external laundry treatment apparatus using a matching rule model according to one embodiment of the present disclosure.

FIG. 21 illustrates, but is not limited to, a case when the laundry treatment apparatus 300 acquires the matching rule model. In another example, the learning apparatus 1000 acquires a matching rule model. The laundry treatment apparatus 300 may have received the matching rule model from the learning apparatus 1000.

The processor 180 compares each of the characteristic elements of the laundry group with each of the associated characteristic elements of the external laundry treatment apparatuses (S2101).

In one embodiment, the laundry group may be a group determined according to the embodiment of FIG. 11 and FIG. 12.

The characteristic elements of the laundry group may be elements extracted according to the characteristic value of the washing group.

The value of the characteristic elements of the laundry group may be an encoded value of the characteristic value of the laundry group.

This will be described with reference to FIG. 22 and FIG. 23 in details.

Figure 22:
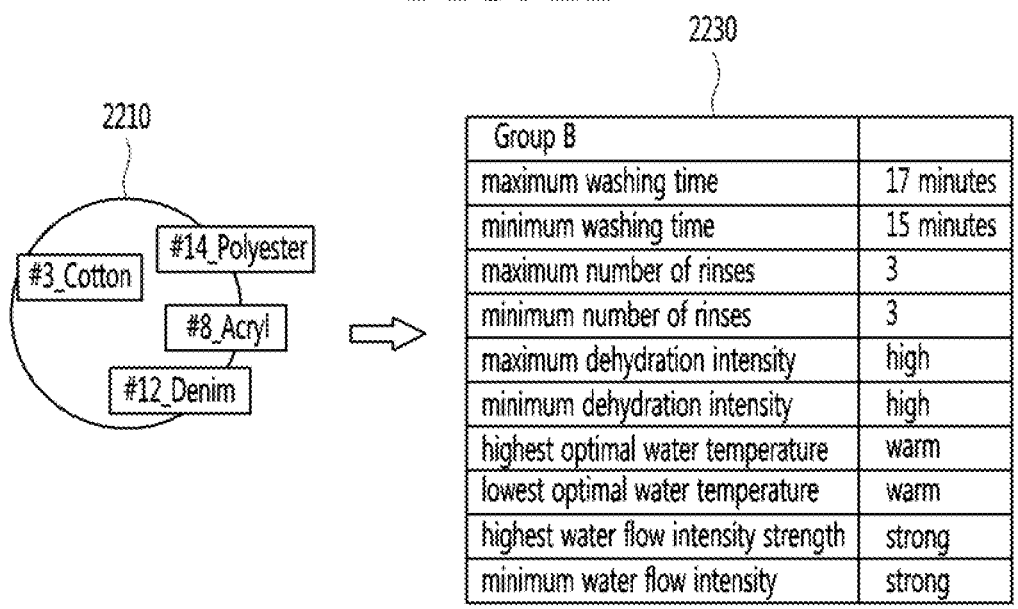
FIG. 22 shows an example of the laundry group and the characteristic values of laundry group according to one embodiment of the present disclosure.

FIG. 22 shows an example of the characteristic values of the laundry group and laundry group according to one embodiment of the present disclosure. FIG. 23 is an example of encoded values of the characteristic elements of the laundry group resulting from processing of the characteristic value of the laundry group according to one embodiment of the present disclosure.

Referring to FIG. 22, there is shown a laundry group 2210 that includes a plurality of main materials. The laundry may be grouped into the laundry group according to the main material of the laundry.

Further, the laundry may be grouped into a group 2210 based on the water washing availability or boiling availability.

The characteristic value table 2230 of the laundry group 2210 indicates that the longest washing time is 17 minutes, the minimum washing time is 15 minutes, the maximum number of rinsing is 3, and the minimum number of rinsing is 3, the maximum spinning strength is high and minimum spinning strength is high, the highest optimal water temperature is warm, the lowest optimal water temperature is warm, the highest water flow intensity strength is strong, and the minimum water flow intensity is strong.

The processor 180 may use the classification characteristic and characteristic value table 2230 of the laundry group 2210 to obtain the characteristic values of the laundry group 2210 and the encoded values of each characteristic element.

The classification characteristic of the laundry group 2210 may be based on water washing availability or boiling availability.

The characteristic elements of the laundry group 2210 may include boiling availability, steam availability, a number of laundry, average damage, average washing time, average rinsing frequency, and average spinning intensity.

When the laundry group 2210 is suitable for the boiling, the processor may set the encoded value of the characteristic element, that is, the boiling to 2. When the boiling is available case by case, the process may set the encoded value of the characteristic element, that is, the boiling to 1. When the laundry group 2210 is not suitable for the boiling, the processor may set the encoded value of the characteristic element, that is, the boiling to 0.

When the laundry group 2210 is suitable for the steaming, the processor may set the encoded value of the characteristic element, that is, the steaming to 1. When the laundry group 2210 is not suitable for the steaming, the processor may set the encoded value of the characteristic element to 0.

The processor 180 may allocate an encoded value based on the number of laundry belonging to laundry group 2210.

The processor 180 may average the degree of damage of each of the laundry (main materials) in the laundry group 2210 and allocate the encoded value based on the average degree of damage.

The processor 180 may allocated the encoded value of the average washing time based on the average value of the longest washing time and the shortest washing time of the characteristic value table 2230.

The processor 180 may allocate the encoded value of the average number of rinsing times based on an average value between the maximum number of rinsing times and the minimum number of rinsing times of the characteristic value table 2230.

The processor 180 may allocate the encoded value of the average spinning intensity based on the average value of the maximum spinning intensity and the minimum spinning intensity of the characteristic value table 2230.

Figure 23:
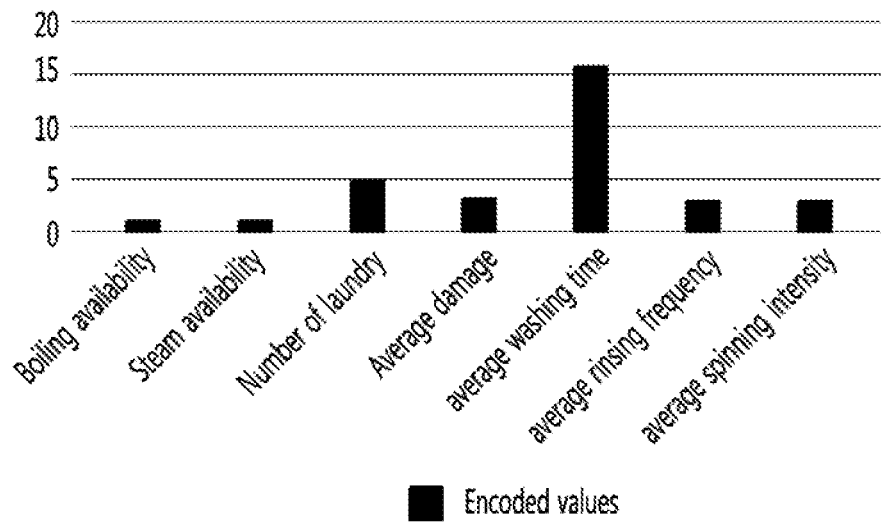
FIG. 23 is an example of encoded values of the characteristic elements of the laundry group resulting from processing of the characteristic value of the laundry group according to one embodiment of the present disclosure.

Referring to FIG. 23, there is shown a bar graph 2300 showing the encoded values for each of the characteristic elements of the laundry group 2210.

Referring to the bar graph 2300, the encoded value of the boiling availability 2. The encoded value of steam availability is 1. The encoded value of the laundry number is 5. The encoded value of average impairment is 5. The encoded value of the average washing time is 17. The encoded value of the average rinsing time is 3.

Figure 24:
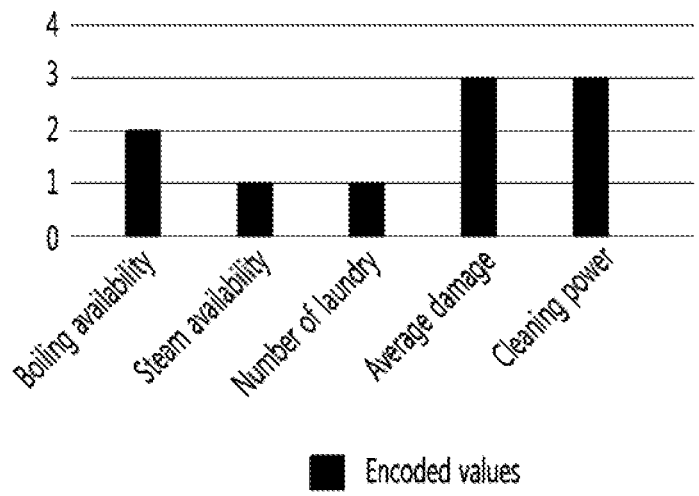
FIG. 24 is a graph that includes encoded values of characteristic elements of an external laundry treatment apparatus according to one embodiment of the present disclosure.

FIG. 24 is a graph that includes encoded values of characteristic elements of an external laundry treatment apparatus according to one embodiment of the present disclosure.

Referring to FIG. 24, a bar graph 2400 is shown showing the encoded values of the characteristic elements of the drum type laundry washing machine.

The characteristics of the drum type laundry washing machine may include boiling availability, steam availability, small amount washing availability, average damage applied to laundry, and cleaning power.

The encoded value of the boiling availability of the drum laundry washing machine is 2. The encoded value of steam washing availability thereof is 1. The encoded value of a small amount washing availability thereof 1. The encoded value of the average damage to the laundry is 3. The encoded value of the cleaning power of the drum type laundry washing machine may be 3.

Again, FIG. 21 will be described.

The processor 180 allocates a score corresponding to each characteristic element according to the comparison result (S2103).

The processor 180 may compare the encoded values of the characteristic elements of the laundry group 2210 with the encoded values of the characteristic elements of the drum laundry washing machine.

This will be described with reference to FIG. 25.

FIG. 25 is an illustration of an example of a matching rule model according to one embodiment of the present disclosure.

The matching rule model 2500 may be configured for comparing each of the characteristic elements of the laundry group 2210 with each of the corresponding characteristic elements of the drum laundry washing machine to allocate matching scores, and for outputting the sum of the scores.

The processor 180 may match each of the characteristic elements of the laundry group 2210 with each of the associated characteristic elements of the drum type laundry washing machine.

The range of the encoded value of each corresponding characteristic element may be predetermined. For example, the range of encoded value of boiling availability may be a value between 0 and 2.

The range of the encoded value of steam availability may be a value between 0 and 1.

The range of the encoded value of the number of laundry may be a value between 0 and 15.

The range of the encoded value of the average damage may be a value between 0 and 5.

The range of the encoded value of the cleaning power may be a value between 0 and 5.

The processor 180 may compare the encoded value 2 of boiling availability of the laundry group with the encoded value 2 of the boiling availability of the drum laundry washing machine.

The processor 180 may assign a score based on the difference between the encoded values.

For example, when the encoded value of boiling availability of the laundry group is equal to the encoded value of the boiling availability of the drum laundry washing machine, a large score may be awarded.

For example, when the encoded value of steaming availability of the laundry group is equal to the encoded value of the steaming availability of the drum laundry washing machine, a large score may be awarded.

In another example, when the encoded value of the laundry number included in the laundry group 2210 is less than or equal to the pre-set value, and when the encoded value of a small amount washing availability of the drum laundry treatment apparatus is 1, a large score may be awarded.

In another example, when the larger the encoded value of the average damage of the laundry group 2210, the smaller the encoded value of the average damage of the drum laundry treatment apparatus, the greater the score may be assigned.

In another example, the larger the encoded value of each of the average washing time and the average rinsing time of the laundry group 2210, the larger the encoded value of the cleaning power of the drum laundry treatment apparatus, the greater the score may be assigned.

Referring to the matching rule model 2500 of FIG. 25, the scores as assigned according to matching percentages between the encoded values of the characteristic elements of the laundry group 2210 and the characteristic elements of the laundry treatment apparatus are shown.

FIG. 25 shows the assigned score for each characteristic element according to the matching result between each characteristic element of the laundry group 2210 and each characteristic element of the drum laundry washing machine.

Again, FIG. 21 will be described.

The processor 180 sums the allocated scores S2105 and determines, as an apparatus to perform washing of laundry, the external laundry treatment apparatus having the largest summed result (S2107).

The processor 180 may perform a matching process according to FIG. 25 between each of a plurality of external laundry treatment apparatuses and the laundry group 2210.

In another example, the processor 180 may perform the matching process according to FIG. 25 between the laundry group and the laundry washing apparatus 300 itself.

The processor 180 may determine the laundry treatment apparatus having the highest score among the plurality of detected laundry treatment apparatuses and the laundry washing apparatus 300, as an apparatus to perform washing of the laundry.

FIG. 26 is a diagram showing the score summation result for each of a plurality of external laundry treatment apparatuses according to one embodiment of the present disclosure.

That is, the laundry treatment apparatus 300 may calculate a score for each of the first to third external laundry treatment apparatuses 300-1 to 300-3 as sensed in the vicinity thereto based on the matching rule model.

Referring to FIG. 26, the sum score of the first external laundry treatment apparatus 300-1 is 34 points. The sum score for the second external laundry treatment apparatus 300-2 is 41 points. The sum score of the third external laundry treatment apparatus 300-3 is 29 points.

The processor 180 may determine the second external laundry treatment apparatus 300-2 with the highest sum score as the most suitable apparatus to perform laundry washing.

Thus, according to the embodiment of the present disclosure, the optimal laundry treatment apparatus for washing laundry is selected, so that the degree of damage to laundry is minimized while the cleaning power is maximized.

Further, in accordance with the present disclosure, the laundry treatment apparatus may be automatically selected, without the user having to select the laundry treatment apparatus to wash the laundry, thus improving user convenience.

Again, FIG. 18 will be described.

The processor 180 sends the laundry information to the determined external laundry treatment apparatus S1809.

The processor 180 may send laundry information to an external laundry treatment apparatus that is determined to perform washing using the short-range communication module 114.

The laundry information as transmitted may be used later to determine the optimal washing course.

The external laundry treatment apparatus determines the values of the washing control variables using the laundry information according to the embodiment of FIG. 4. Then, the external laundry treatment apparatus may execute the washing using a washing course according to the determined values of the washing control variables.

In one example, the steps of FIG. 18 and FIG. 21 are described as being performed by the laundry treatment apparatus 300. However, the present disclosure is not limited thereto. The steps of FIG. 18 and FIG. 21 may be executed by the terminal 100.

That is, the terminal 100 detects nearby laundry treatment apparatuses, and obtains the identification information of the detected laundry treatment apparatuses.

The terminal 100 may use the acquired identification information to acquire the characteristic information of the sensed laundry treatment apparatuses. Based on the acquired characteristic information and laundry information, the terminal 100 may determine an optimal laundry treatment apparatus to wash laundry.

In one example, the terminal 100 may be named an AI apparatus.

Figure 27:
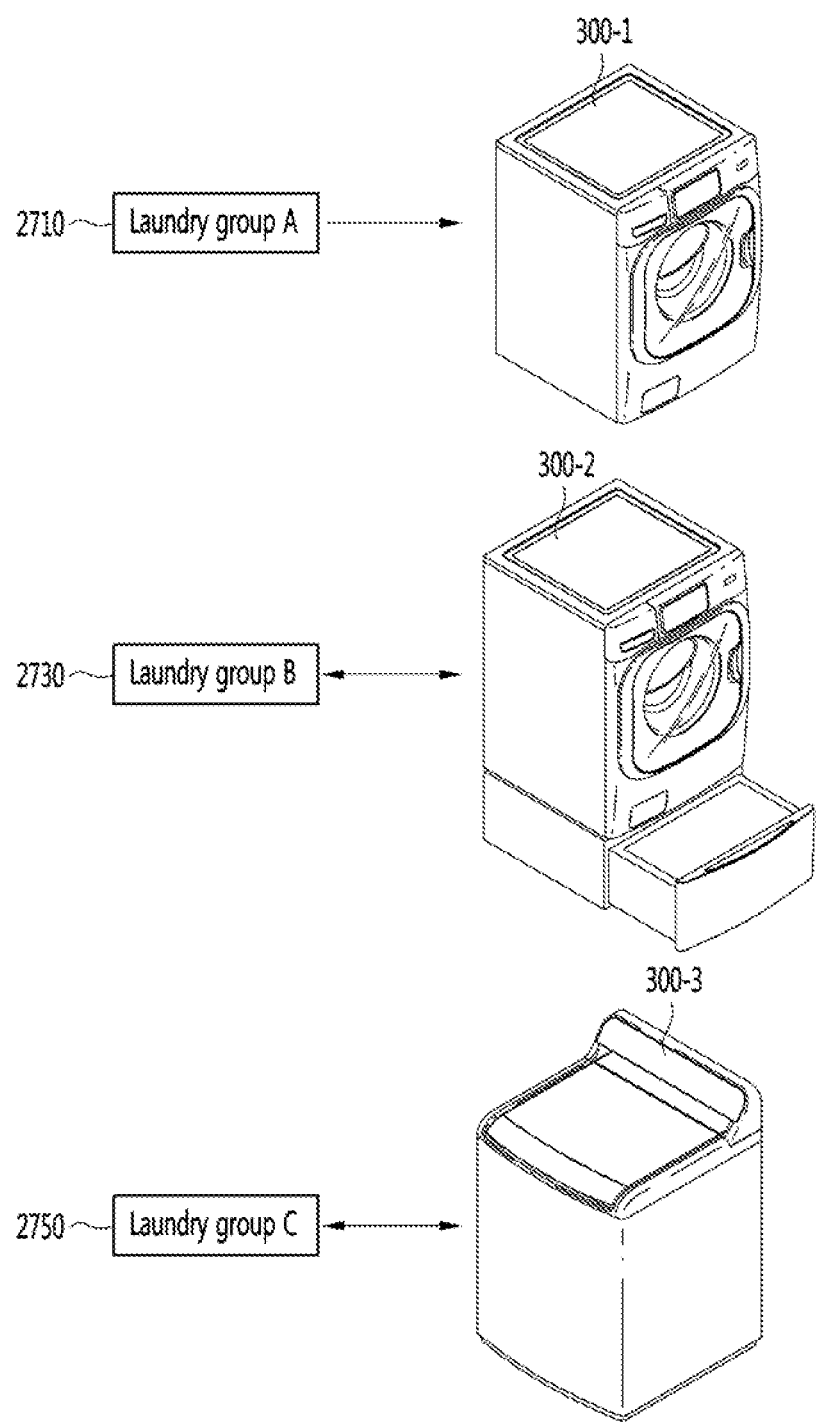
FIG. 27 is a diagram showing an example in which each of a plurality of laundry groups is mapped to each of external laundry treatment apparatuses according to an embodiment of the present disclosure.

FIG. 27 is a diagram showing an example in which each of a plurality of laundry groups is mapped to one external laundry treatment apparatus according to an embodiment of the present disclosure.

Each laundry group includes a number of laundry.

The laundry treatment apparatus 300 may determine an external laundry treatment apparatus that matches each laundry group based on the matching rule model.

For example, the laundry treatment apparatus 300 may match the laundry group A 2710 to the first external laundry treatment apparatus 300-1.

The laundry treatment apparatus 300 may match the laundry group B 2730 to the second external laundry treatment apparatus 300-2.

The laundry treatment apparatus 300 may match the laundry group C 2750 to the third external laundry treatment apparatus 300-3.

FIG. 28 is an illustration of an example in which the laundry treatment apparatus outputs information about each laundry group to a selected laundry treatment apparatus to perform washing of each laundry group according to one embodiment of the present disclosure.

The laundry treatment apparatus 300 may output the washing treatment information 2800 using the output unit 150.

For example, when the laundry treatment apparatus 300 includes the display 151, the display 151 may be used to display the washing treatment information 2800.

When the laundry treatment apparatus 300 includes an sound output unit 152, the washing treatment information 2800 may be output as voice.

The washing treatment information 2800 may include types of main materials, the number of main materials included in each of the plurality of laundry groups, the boiling availability thereof, the steam availability, and the number of colors with a high probability of dye transfer.

The washing treatment information 2800 may further include guidance information to inform the user which external laundry treatment apparatus to receive the laundry group.

The guide information may include options (whether the boiling course function is to be added or whether the steam function is to be added) that are required to be specified by the user.

Thus, when a plurality of laundry form a laundry group, the laundry treatment apparatus according to the embodiment of the present disclosure may recommend a laundry treatment apparatus suitable for the laundry group.

Accordingly, the laundry may be washed in an optimal washing condition.

The present invention may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the first controller 180 of the terminal.

What is claimed is:

1. An artificial intelligence (AI) apparatus comprising:
   a short-range communication module configured to detect a plurality of laundry treatment apparatuses positioned around the AI apparatus; and
   a processor configured to:
   acquire laundry information about laundry and characteristic information of each of the detected plurality of laundry treatment apparatuses;
   determine a laundry group corresponding to the laundry based on the acquired laundry information;
   determine a laundry treatment apparatus for washing the laundry among the plurality of laundry treatment apparatuses based on a comparison result between characteristic information of the determined laundry group including at least one of boiling availability, steam availability, a number of laundry items, average degree of damage, average rinsing time, average washing time, or average spinning intensity and characteristic information of each of the plurality of laundry treatment apparatuses including at least one of the boiling availability, the steam availability, small amount washing availability, the average degree of damage, or cleaning power; and
   transmit the laundry information to the determined laundry treatment apparatus, wherein the determined laundry treatment apparatus is configured to execute a washing course using the transmitted laundry information.

2. The AI apparatus of claim 1, wherein the processor is further configured to:
   acquire each score corresponding to each of the plurality of laundry treatment apparatuses according to each comparison result; and
   determine a laundry treatment apparatus having a highest score as the laundry treatment apparatus for washing the laundry.

3. The AI apparatus of claim 2, wherein the processor is further configured to:
   match encoded values of characteristic elements included in the characteristic information of the laundry group with encoded values of characteristic elements included in the characteristic information of each of the laundry treatment apparatuses;
   acquire a score for each characteristic element based on each matching result; and
   sum scores for the characteristic elements to obtain a sum score.

4. The AI apparatus of claim 1, wherein the AI apparatus further include a sound output unit or a display,
   wherein the processor is further configured to control the sound output unit or display to output, in an audio or visual manner, washing treatment information to inform that the laundry is to be input to the determined laundry treatment apparatus.

5. The AI apparatus of claim 1, wherein the processor is further configured to:
   receive each identification information about each of the plurality of laundry treatment apparatuses therefrom; and
   acquire characteristic information about each laundry treatment apparatus based on each received identification information.

6. The AI apparatus of claim 1, wherein the AI apparatus further include a camera for taking a tag image attached to the laundry, wherein the processor is further configured to acquire the laundry information based on the tag image, wherein the laundry information includes at least one of a mixed ratio of each material in the laundry or a laundry handling instruction image.

7. A method for operating an artificial intelligence (AI) apparatus, the method comprising:
   detecting a plurality of laundry treatment apparatuses positioned around the AI apparatus;
   acquiring laundry information about laundry and characteristic information of each of the detected plurality of laundry treatment apparatuses;
   determining a laundry group corresponding to the laundry based on the acquired laundry information;
   determining a laundry treatment apparatus for washing the laundry among the plurality of laundry treatment apparatuses based on a comparison result between characteristic information of the determined laundry group including at least one of boiling availability, steam availability, a number of laundry items, average degree of damage, average rinsing time, average washing time, or average spinning intensity and characteristic information of each of the plurality of laundry treatment apparatuses including at least one of the boiling availability, the steam availability, small amount washing availability, the average degree of damage, or cleaning power; and
   transmitting the laundry information to the determined laundry treatment apparatus, wherein the determined laundry treatment apparatus is configured to execute a washing course using the transmitted laundry information.

8. The method of claim 7, wherein determining the laundry treatment apparatus for washing the laundry includes:
   acquiring each score corresponding to each of the plurality of laundry treatment apparatuses according to each comparison result; and
   determining a laundry treatment apparatus having a highest score as the laundry treatment apparatus for washing the laundry.

9. The method of claim 8, wherein determining the laundry treatment apparatus having the highest score includes:
   matching encoded values of characteristic elements included in the characteristic information of the laundry group with encoded values of characteristic elements included in the characteristic information of each of the laundry treatment apparatuses;
   acquiring a score for each characteristic element based on each matching result; and
   summing scores for the characteristic elements to obtain a sum score.

10. The method of claim 7, wherein the method further comprises outputting washing treatment information to inform that the laundry is to be input to the determined laundry treatment apparatus.

11. The method of claim 7, wherein acquiring the characteristic information of each of the detected plurality of laundry treatment apparatuses includes:
   receiving each identification information about each of the plurality of laundry treatment apparatuses therefrom; and
   acquiring characteristic information about each laundry treatment apparatus based on each received identification information.

12. The AI apparatus of claim 7, wherein acquiring the laundry information includes:
   taking a tag image attached to the laundry; and
   acquiring the laundry information based on the tag image, wherein the laundry information includes at least one of a mixed ratio of each material in the laundry or a laundry handling instruction image.

13. A storage medium having a program stored therein, wherein the program is configured to performing a method for operating an AI apparatus, wherein the method includes:
   detecting a plurality of laundry treatment apparatuses positioned around the AI apparatus;
   acquiring laundry information about laundry and characteristic information of each of the detected plurality of laundry treatment apparatuses;
   determining a laundry group corresponding to the laundry based on the acquired laundry information;
   determining a laundry treatment apparatus for washing the laundry among the plurality of laundry treatment apparatuses based on a comparison result between characteristic information of the determined laundry group including at least one of boiling availability, steam availability, a number of laundry items, average degree of damage, average rinsing time, average washing time, or average spinning intensity and characteristic information of each of the plurality of laundry treatment apparatuses including at least one of the boiling availability, the steam availability, small amount washing availability, the average degree of damage, or cleaning power; and
   transmitting the laundry information to the determined laundry treatment apparatus, wherein the determined laundry treatment apparatus is configured to execute a washing course using the transmitted laundry information.

* * * * *